United States Patent
Iizuka et al.

(10) Patent No.: US 9,716,673 B2
(45) Date of Patent: Jul. 25, 2017

(54) PACKET STORAGE METHOD AND PACKET STORAGE APPARATUS

(71) Applicant: FUJITSU LIMITED, Kawasaki-shi, Kanagawa (JP)

(72) Inventors: Fumiyuki Iizuka, Kawasaki (JP); Yuji Nomura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 153 days.

(21) Appl. No.: 14/496,730

(22) Filed: Sep. 25, 2014

(65) Prior Publication Data

US 2015/0131451 A1    May 14, 2015

(30) Foreign Application Priority Data

Nov. 12, 2013 (JP) ................. 2013-234460

(51) Int. Cl.
*H04L 12/861* (2013.01)
(52) U.S. Cl.
CPC ................. *H04L 49/9057* (2013.01)
(58) Field of Classification Search
CPC ............... H04L 49/9057; H04L 43/04
See application file for complete search history.

(56) References Cited

U.S. PATENT DOCUMENTS

| | | | | |
|---|---|---|---|---|
| 5,787,253 A | * | 7/1998 | McCreery | H04L 29/06 370/351 |
| 7,328,127 B2 | * | 2/2008 | Otsuka | G06F 11/3419 702/182 |
| 2004/0100977 A1 | | 5/2004 | Suzuki et al. | |
| 2007/0022327 A1 | | 1/2007 | Otsuka et al. | |
| 2007/0297333 A1 | | 12/2007 | Zuk et al. | |
| 2008/0031240 A1 | * | 2/2008 | Hughes | H04L 45/745 370/389 |
| 2012/0230186 A1 | * | 9/2012 | Lee | H04L 43/028 370/230 |
| 2012/0240225 A1 | | 9/2012 | Yasuie et al. | |

FOREIGN PATENT DOCUMENTS

| | | |
|---|---|---|
| JP | 2004-158903 | 6/2004 |
| JP | 2007-26303 | 2/2007 |
| JP | 2007-96413 | 4/2007 |
| JP | 2008-11537 | 1/2008 |
| JP | 2012-195699 | 10/2012 |

OTHER PUBLICATIONS

Office Action issued by the Japanese Patent Office on Jun. 6, 2017 in corresponding Japanese patent application No. 2013-234460.

* cited by examiner

*Primary Examiner* — Siming Liu
(74) *Attorney, Agent, or Firm* — Staas & Halsey LLP

(57) ABSTRACT

There is provided a packet storage method including: processing in which a sequence identifier is successively assigned to a packet captured from a network and the packet is stored in a buffer; creation processing in which the packet is read out from the buffer, a first identifier involved in a first property of the packet is identified, and an index data that mutually correlates the sequence identifier and the first identifier is created; and storage processing in which the packet corresponding to the sequence identifier included in the index data is read out from the buffer, the packet is sorted according to the first identifier included in the index data, and the sorted packet is stored in a storage unit on a per-first-identifier basis, executed by a processor.

12 Claims, 48 Drawing Sheets

| HEADER SECTION | CONNECTION ID | TRANSMISSION SOURCE IP ADDRESS | TRANSMISSION SOURCE PORT NUMBER | TRANSMISSION DESTINATION IP ADDRESS | TRANSMISSION DESTINATION PORT NUMBER | PROTOCOL NUMBER |
|---|---|---|---|---|---|---|
| | CN-11 | 10.20.30.40 | 2000 | 20.30.40.50 | 80 | 6 |

| TABLE SECTION | PACKET ID | RELATIVE OFFSET |
|---|---|---|
| | PC-011 | 0 |
| | PC-016 | 624 |
| | ⋮ | ⋮ |

FIG. 2

| PACKET ID | CONNECTION ID |
|---|---|
| PC-001 | CN-01 |
| PC-002 | CN-02 |
| PC-003 | CN-02 |
| PC-004 | CN-03 |
| PC-005 | CN-03 |
| PC-006 | CN-01 |
| ⋮ | ⋮ |

FIG. 3

| CONNECTION ID | TRANSMISSION SOURCE IP ADDRESS | TRANSMISSION SOURCE PORT NUMBER | TRANSMISSION DESTINATION IP ADDRESS | TRANSMISSION DESTINATION PORT NUMBER | PROTOCOL NUMBER |
|---|---|---|---|---|---|
| CN-1 | 10.20.30.40 | 2000 | 10.20.30.50 | 20 | 6 |
| CN-02 | 20.30.40.50 | 3000 | 10.20.30.60 | 80 | 6 |
| CN-03 | 30.40.50.60 | 4000 | 40.50.60.70 | 3000 | 17 |
| ⋮ | ⋮ | ⋮ | ⋮ | ⋮ | ⋮ |

FIG. 10

| CONNECTION ID | TRANSMISSION SOURCE IP ADDRESS | TRANSMISSION SOURCE PORT NUMBER | TRANSMISSION DESTINATION IP ADDRESS | TRANSMISSION DESTINATION PORT NUMBER | PROTOCOL NUMBER |
|---|---|---|---|---|---|
| CN-01 | 10.20.30.40 | 2000 | 10.20.30.50 | 20 | 6 |
| PACKET ID | | | | OFFSET | |
| PC-001 | | | | 0 | |
| PC-006 | | | | 624 | |
| ... | | | | ... | |

HEADER SECTION: top two rows
TABLE SECTION: remaining rows

FIG. 15

| PACKET ID | CONNECTION ID | HOST COMBINATION ID |
|---|---|---|
| PC-011 | CN-11 | HtoH-01 |
| PC-012 | CN-12 | HtoH-01 |
| PC-013 | CN-12 | HtoH-01 |
| PC-014 | CN-13 | HtoH-02 |
| PC-015 | CN-13 | HtoH-02 |
| PC-016 | CN-11 | HtoH-01 |
| ⋮ | ⋮ | ⋮ |

FIG. 16

| CONNECTION ID | TRANSMISSION SOURCE IP ADDRESS | TRANSMISSION SOURCE PORT NUMBER | TRANSMISSION DESTINATION IP ADDRESS | TRANSMISSION DESTINATION PORT NUMBER | PROTOCOL NUMBER |
|---|---|---|---|---|---|
| CN-11 | 10.20.30.40 | 2000 | 20.30.40.50 | 80 | 6 |
| CN-12 | 10.20.30.40 | 2100 | 20.30.40.50 | 80 | 6 |
| CN-13 | 30.40.50.60 | 2100 | 20.30.40.50 | 80 | 6 |
| ⋮ | ⋮ | ⋮ | ⋮ | ⋮ | ⋮ |

FIG. 17

| HOST COMBINATION ID | TRANSMISSION SOURCE IP ADDRESS | TRANSMISSION DESTINATION IP ADDRESS |
|---|---|---|
| HtoH-01 | 10.20.30.40 | 20.30.40.50 |
| HtoH-02 | 30.40.50.60 | 20.30.40.50 |
| ⋮ | ⋮ | ⋮ |

FIG. 21

| | CONNECTION ID | TRANSMISSION SOURCE IP ADDRESS | TRANSMISSION SOURCE PORT NUMBER | TRANSMISSION DESTINATION IP ADDRESS | TRANSMISSION DESTINATION PORT NUMBER | PROTOCOL NUMBER |
|---|---|---|---|---|---|---|
| HEADER SECTION | CN-11 | 10.20.30.40 | 2000 | 20.30.40.50 | 80 | 6 |
| TABLE SECTION | PACKET ID | | | | RELATIVE OFFSET | |
| | PC-011 | | | | 0 | |
| | PC-016 | | | | 624 | |
| | ... | | | | ... | |

FIG. 22

| CONNECTION ID | TRANSMISSION SOURCE IP ADDRESS | TRANSMISSION SOURCE PORT NUMBER | TRANSMISSION DESTINATION IP ADDRESS | TRANSMISSION DESTINATION PORT NUMBER | PROTOCOL NUMBER |
|---|---|---|---|---|---|
| CN-12 | 10.20.30.40 | 2100 | 20.30.40.50 | 80 | 6 |
| PACKET ID | | | | RELATIVE OFFSET | |
| PC-012 | | | | 0 | |
| PC-013 | | | | 1046 | |
| ... | | | | ... | |

HEADER SECTION: rows 1–2
TABLE SECTION: rows 3+

| HEADER SECTION | HOST COMBINATION ID | TRANSMISSION SOURCE IP ADDRESS | TRANSMISSION DESTINATION IP ADDRESS |
|---|---|---|---|
| | HotH-01 | 10.20.30.40 | 20.30.40.50 |
| TABLE SECTION | CONNECTION ID | START OFFSET | |
| | CN-11 | 0 | |
| | CN-12 | 62004 | |

FIG. 26

| PACKET ID | CONNECTION ID | SUBNET COMBINATION ID |
|---|---|---|
| PC-011 | CN-11 | StoS-01 |
| PC-012 | CN-12 | StoS-01 |
| PC-013 | CN-12 | StoS-01 |
| PC-014 | CN-13 | StoS-02 |
| PC-015 | CN-13 | StoS-02 |
| PC-016 | CN-11 | StoS-01 |
| ⋮ | ⋮ | ⋮ |

FIG. 27

| SUBNET COMBINATION ID | TRANSMISSION SOURCE SUBNET ADDRESS | TRANSMISSION DESTINATION SUBNET ADDRESS |
|---|---|---|
| StoS-01 | 10.20.30.0/24 | 20.30.40.0/24 |
| StoS-02 | 30.40.50.0/24 | 20.30.40.0/24 |
| ⋮ | ⋮ | ⋮ |

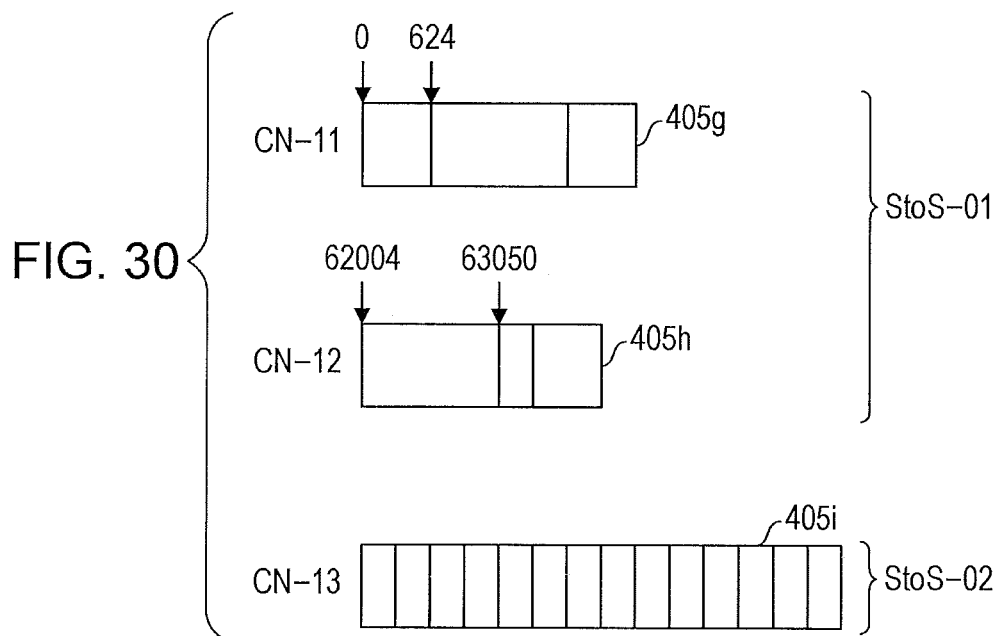

FIG. 34

| PACKET ID | CONNECTION ID | NETWORK QUALITY |
|---|---|---|
| PC-001 | CN-01 | MANY LOSSES |
| PC-002 | CN-02 | MANY LOSSES |
| PC-003 | CN-02 | MANY LOSSES |
| PC-004 | CN-03 | PROLONGED RTT |
| PC-005 | CN-03 | PROLONGED RTT |
| PC-006 | CN-01 | MANY LOSSES |
| ⋮ | ⋮ | ⋮ |

| HEADER SECTION | NETWORK QUALITY | |
| --- | --- | --- |
| | MANY LOSSES | |
| TABLE SECTION | CONNECTION ID | START OFFSET |
| | CN-01 | 0 |
| | CN-02 | 62004 |

FIG. 41

| PACKET ID | CONNECTION ID | URLID |
|---|---|---|
| PC-011 | CN-11 | URL-01 |
| PC-012 | CN-12 | URL-01 |
| PC-013 | CN-12 | URL-01 |
| PC-014 | CN-13 | URL-01 |
| PC-015 | CN-13 | URL-01 |
| PC-016 | CN-11 | URL-01 |
| ⋮ | ⋮ | ⋮ |

FIG. 42

| URLID | URL |
|---|---|
| URL-01 | www.example.com |
| URL-02 | www.example2.com/sports |
| ⋮ | ⋮ |

FIG. 43

| URLID | CONNECTION ID |
|---|---|
| URL-01 | CN-11 |
| URL-01 | CN-12 |
| URL-01 | CN-13 |
| ⋮ | ⋮ |

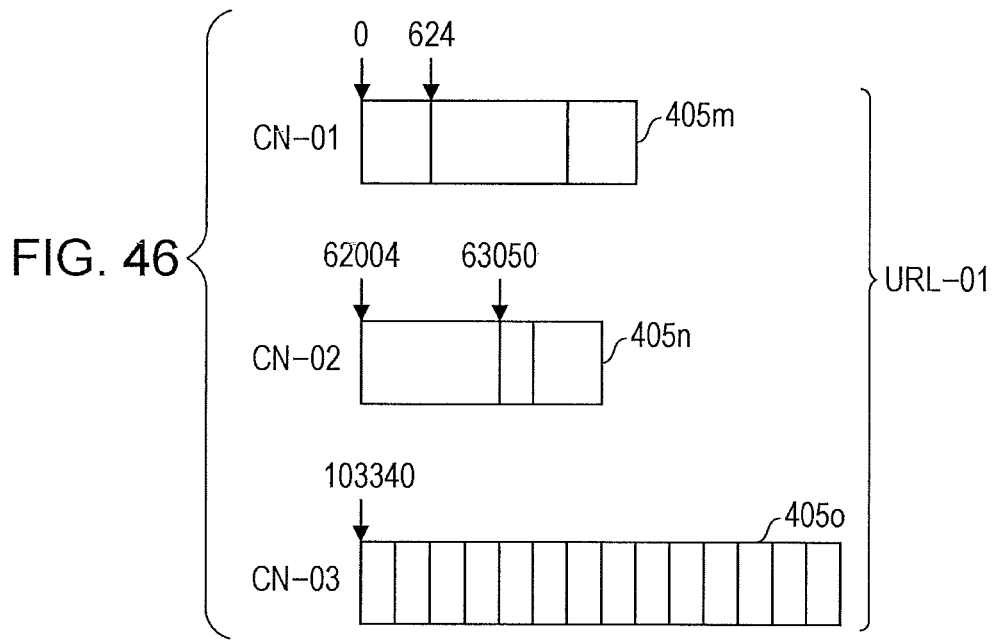

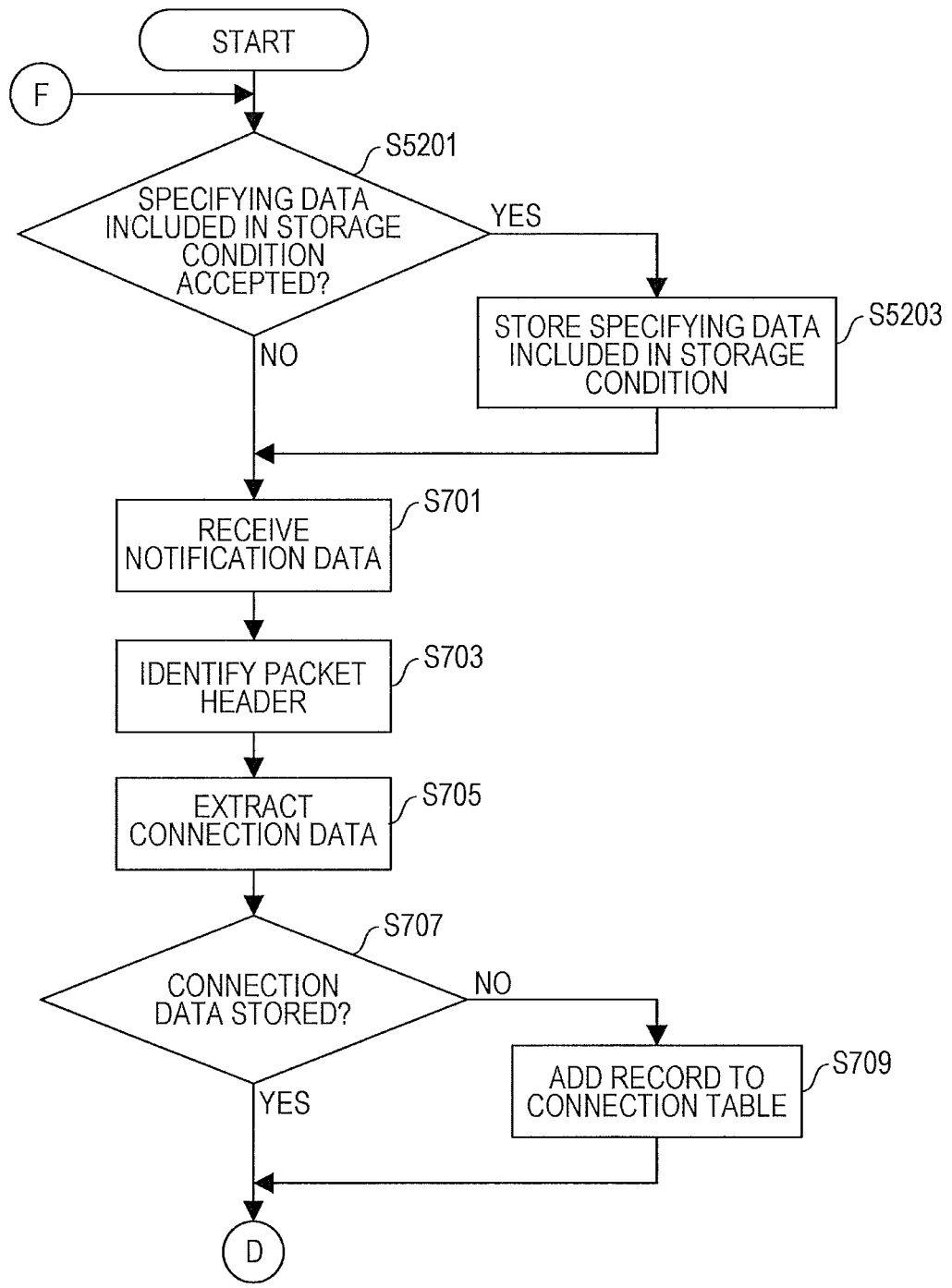

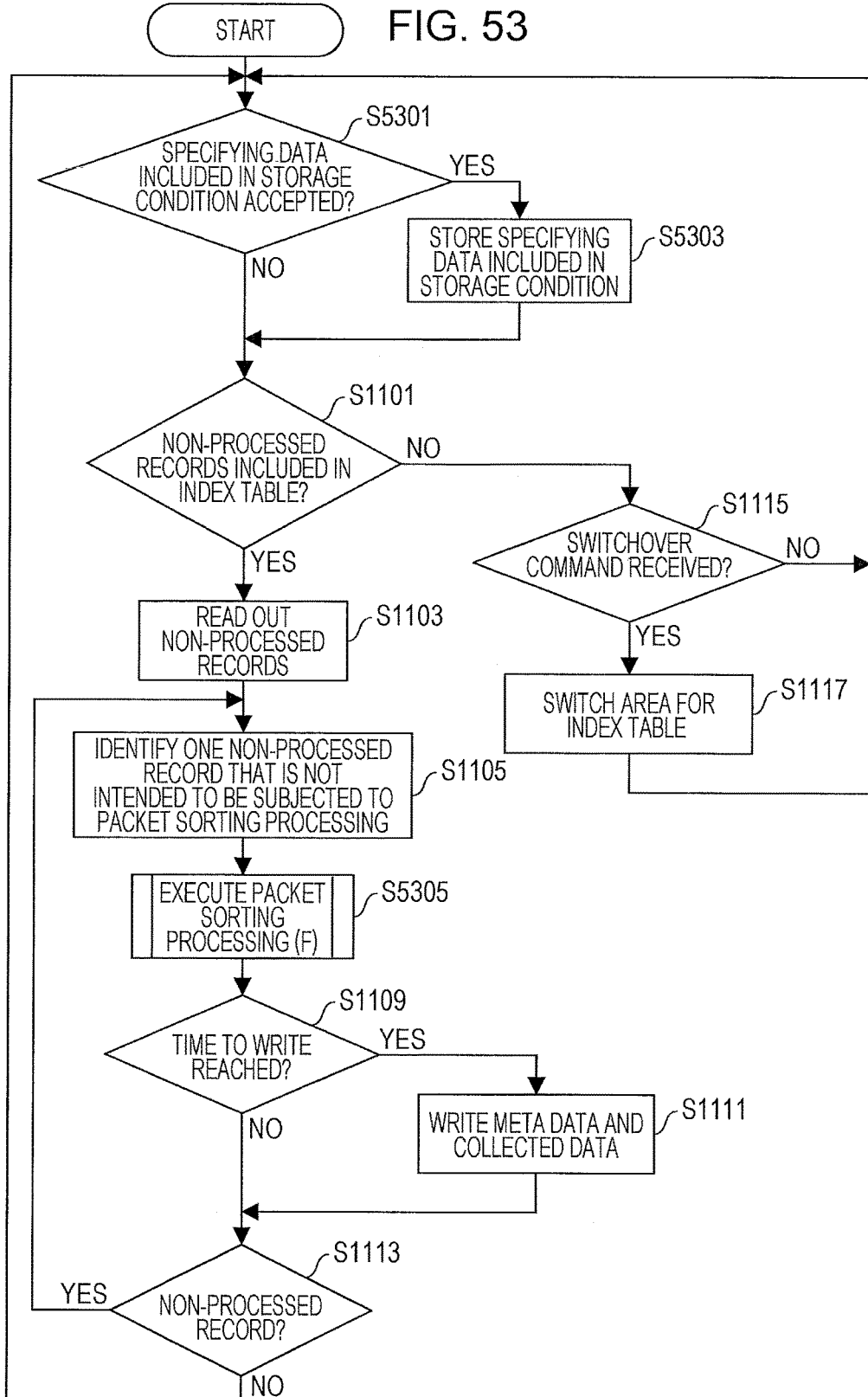

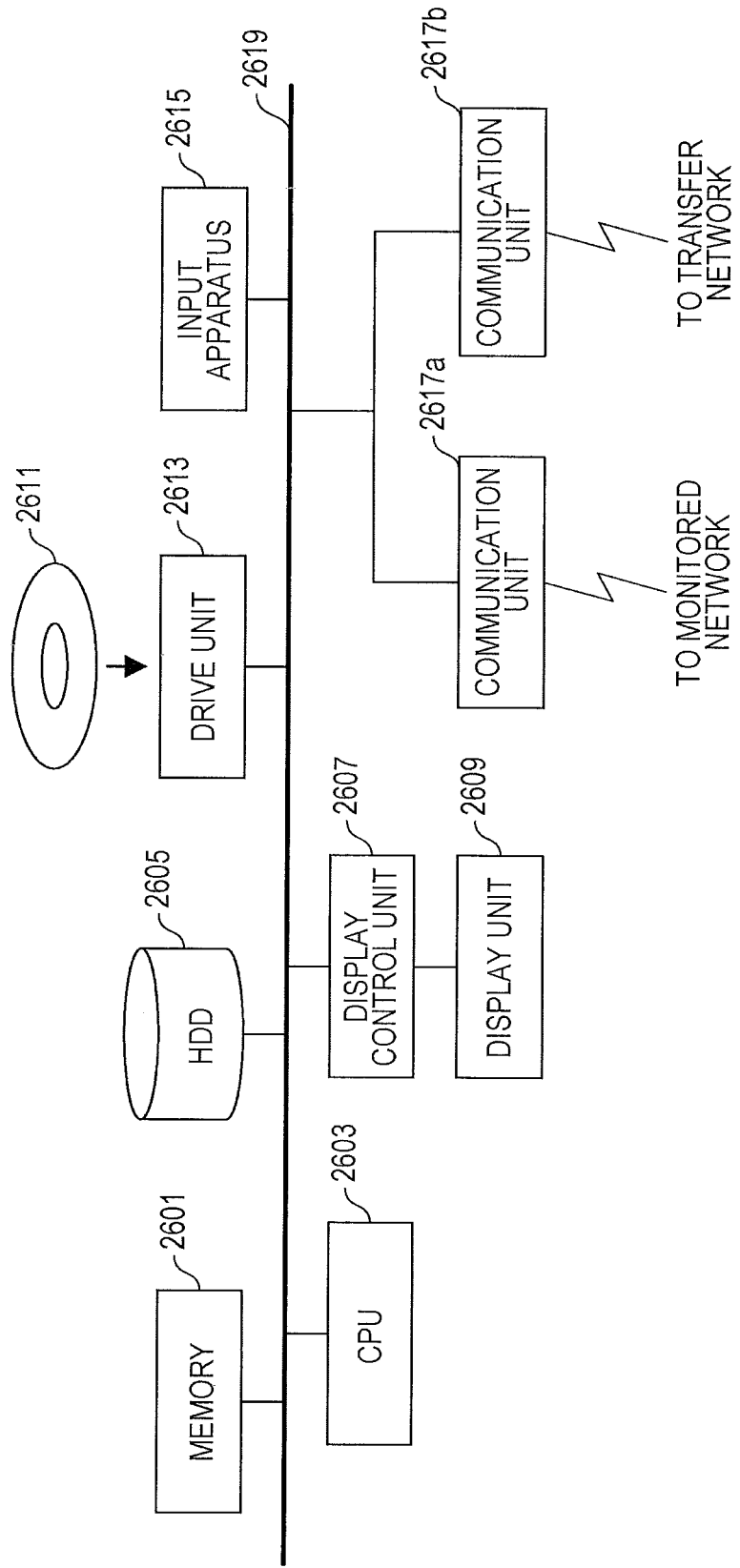

PACKET STORAGE METHOD AND PACKET STORAGE APPARATUS

CROSS-REFERENCE TO RELATED APPLICATION

This application is based upon and claims the benefit of priority of the prior Japanese Patent Application No. 2013-234460 filed on Nov. 12, 2013, the entire contents of which are incorporated herein by reference.

FIELD

The embodiments discussed herein are related to a packet storage method and a packet storage apparatus to store packets captured from a network.

BACKGROUND

An example of a related technology is a network monitoring apparatus that captures packets passing through a switch by mirroring and monitors the state of the network.

Specifically, there is a method in which packets are successively analyzed and the state of the network is analyzed in an instant by performing processing to obtain the number of lost packets and a round-trip time (RTT) and other statistical processing according to analysis results. In another method, captured packets are accumulated and the state of the network is analyzed in an ex post facto manner.

However, a large load is involved in processing to extract packets having a prescribed property from a vast amount of data including packets extracted at random. If processing to accumulate packets is also performed in a series of processing flow including the analysis processing described above, processing performance in the instant analysis is lowered. A list structure may be used to temporarily sort packets. In this case as well, a large processing load is involved.

In recent years, a vast amount of data is being transferred on a network, so there is a demand for a packet storage method that contributes to smooth analysis without lowering the processing performance of a network monitoring apparatus.

Examples of related art are Japanese Laid-open Patent Publication Nos. 2007-96413, 2008-11537, and 2004-158903.

SUMMARY

According to an aspect of the invention, a packet storage method includes: processing in which a sequence identifier is successively assigned to a packet captured from a network and the packet is stored in a buffer; creation processing in which the packet is read out from the buffer, a first identifier involved in a first property of the packet is identified, and an index data that mutually correlates the sequence identifier and the first identifier is created; and storage processing in which the packet corresponding to the sequence identifier included in the index data is read out from the buffer, the packet is sorted according to the first identifier included in the index data, and the sorted packet is stored in a storage unit on a per-first-identifier basis, executed by a processor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates an example of an index table in the first embodiment;

FIG. 3 illustrates an example of a connection table in the first embodiment;

FIG. 10 illustrates an example of meta data in the first embodiment;

FIG. 15 illustrates an example of an index table in the second embodiment;

FIG. 16 illustrates an example of a connection table in the second embodiment;

FIG. 17 illustrates an example of a host combination table;

FIG. 21 illustrates an example of meta data in the second embodiment;

FIG. 22 illustrates another example of meta data in the second embodiment;

FIG. 26 illustrates an example of an index table in a third embodiment;

FIG. 27 illustrates an example of a subnet combination table;

FIG. 30 illustrates examples of collected data in the third embodiment;

FIG. 31 illustrates an example of high-order meta data in the third embodiment;

FIG. 34 illustrates an example of an index table in a fourth embodiment;

FIG. 37 illustrates examples of collected data in the fourth embodiment;

FIG. 41 illustrates an example of an index table in a fifth embodiment;

FIG. 42 illustrates an example of a uniform resource locator (URL) table;

FIG. 43 illustrates an example of a related table;

FIG. 46 illustrates examples of collected data in the fifth embodiment;

FIG. 47 illustrates an example of high-order meta data in the fifth embodiment;

FIG. 52A illustrates a flow of processing, in the sixth embodiment, executed by the analyzing unit;

FIG. 53 illustrates a flow of processing, in the sixth embodiment, executed by the storage processing unit;

FIG. 55 is a functional block diagram of a computer apparatus.

DESCRIPTION OF EMBODIMENTS

With reference to the drawings, a technology will be described that reduces a load involved in instant analysis processing performed when a plurality of captured packets are stored according to the property of each of the plurality of packets.

First Embodiment

Figure 1:
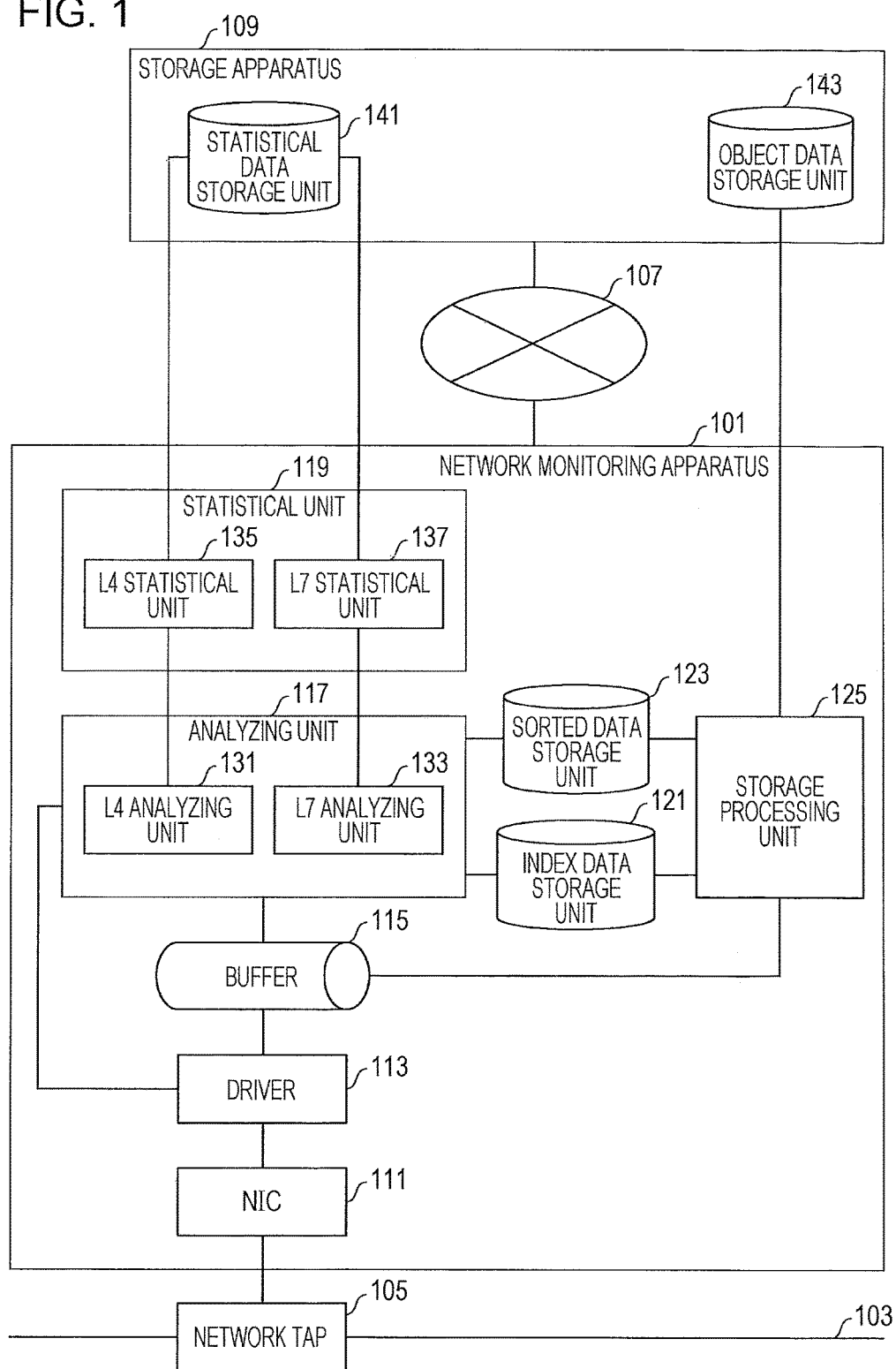
FIG. 1 illustrates an example of the structure of a network monitoring system a first embodiment.

FIG. 1 illustrates an example of the structure of a network monitoring system in the first embodiment. A network monitoring apparatus 101 is connected to a monitored network 103 through a network tap 105. The monitored network 103 is, for example, a local area network (LAN). The network monitoring apparatus 101 captures a packet that is being transferred in the monitored network 103. For example, the network monitoring apparatus 101 copies a packet that passes through a switch in the monitored network 103 to a mirror port to capture the packet. Alternatively, the network monitoring apparatus 101 may use a tap to capture a packet. Data of protocol data unit (PDU) such as a packet, a frame, or a cell is captured, depending on the network. In embodiments below, a packet will be described as an example of a PDU.

The network monitoring apparatus 101 includes a network interface card (NIC) 111, a driver 113, a buffer 115, an analyzing unit 117, a statistical unit 119, an index data storage unit 121, a sorted data storage unit 123, and a storage processing unit 125. The NIC 111 is an interface card used to connect to a network. The driver 113 extracts a packet, stores the extracted packet in the buffer 115, and assigns an ID to the extracted packet. The buffer 115 stores packets.

The analyzing unit 117 mainly analyzes a packet and creates index data used to sort the packet. The analyzing unit 117 includes an L4 analyzing unit 131 and an L7 analyzing unit 133. The L4 analyzing unit 131 performs analysis related to the fourth layer (referred to below as L4) in the open systems interconnection (OSI) reference model defined by the ISO. The L7 analyzing unit 133 performs analysis related to the seventh layer (referred to below as L7) in the OSI reference model defined by the ISO.

The statistical unit 119 performs statistical processing according to analysis results of the analyzing unit 117. The statistical unit 119 includes an L4 statistical unit 135 and an statistical unit 137. The L4 analyzing unit 131 performs statistical processing related to L4. Specifically, the L4 analyzing unit 131 diagnoses a network state substantially in real time from the number of transmitted and received packets and bytes, the number of lost packets, an RTT, and other statistically analyzed information. The L7 analyzing unit 133 performs statistical processing related to L7.

The index data storage unit 121 includes two areas in which an index table is stored. The sorted data storage unit 123 stores a connection table related to data used to sort packets. The storage processing unit 125 sorts packets and stores the sorted packets and collected object data in a storage unit.

The network monitoring apparatus 101 is connected to a storage apparatus 109 through a transfer network 107. The storage apparatus 109 includes a statistical data storage unit 141 and an object data storage unit 143. The statistical data storage unit 141 stores data in a result of the statistical processing performed by the statistical unit 119. The object data storage unit 143 stores object data. The transfer network 107 may be the same type of network as the monitored network 103.

An index table stored in the index data storage unit 121 will be described. FIG. 2 illustrates an example of an index table in the first embodiment. For each packet, an identifier related to the property of the packet is set in the index table. In this example, the connection ID is an example of the identifier related to the property of the packet. The index table has packet-specific records. Each record has a field in which a packet ID is set and a field in which a connection ID is set. The packet ID is one of identifiers that are sequentially assigned to captured packets.

This example indicates that a connection related to a packet to which a packet ID of PC-001 is assigned in a first record is identified by a connection ID of CN-01.

This example also indicates that a connection related to a packet to which a packet ID of PC-002 is assigned in a second record is identified by a connection ID of CN-02.

This example also indicates that a connection related to a packet to which a packet ID of PC-003 is assigned in a third record is identified by a connection ID of CN-02.

This example also indicates that a connection related to a packet to which a packet ID of PC-004 is assigned in a fourth record is identified by a connection ID of CN-03.

This example also indicates that a connection related to a packet to which a packet ID of PC-005 is assigned in a fifth record is identified by a connection ID of CN-03.

This example also indicates that a connection related to a packet to which a packet ID of PC-006 is assigned in a sixth record is identified by a connection ID of CN-01.

Next, a connection table stored in the sorted data storage unit 123 will be described. FIG. 3 illustrates an example of a connection table in the first embodiment. For each connection, data that defines the connection is set in the connection table. The connection table has connection-specific records. Each record has a field in which an connection ID is set, a field in which a transmission source Internet protocol (IP) address is set, a field in which a transmission source port number is set, a field in which a transmission destination IP address is set, a field in which a transmission destination port number is set, and a field in which a protocol number is set.

The connection ID is an identifier assigned by the analyzing unit 117 to identify a connection. The transmission source IP address is the IP address of a host apparatus that transmits the packet. The transmission source port number is the number of a port from which the host apparatus, which is the transmission source of the packet, transmits the packet. The transmission destination IP address is the IP address of a host apparatus corresponding to the transmission destination of the packet. The transmission destination port number is the number of a port at which the packet is received by the host apparatus corresponding to the transmission destination of the packet. The protocol number is a number that identifies a protocol in the fourth layer in the OSI reference model defined by the ISO. The protocol number 6 indicates the transmission control protocol (TCP), and the protocol number 17 indicates that user datagram protocol (UDP).

A first record in this example indicates that for a connection to which a connection ID of CN-01 is assigned, the port number 2000 in a host apparatus with an IP address of 10.20.30.40 corresponds to the transmission source and that the port number 20 in a host apparatus with an IP address of 10.20.30.50 corresponds to the transmission destination. The first record also indicates that the protocol in the fourth layer in this connection is TCP.

A second record in this example indicates that for a connection to which a connection ID of CN-02 is assigned, the port number 3000 in a host apparatus with an IP address of 20.30.40.50 corresponds to the transmission source and that the port number 80 in a host apparatus with an IP address of 10.20.30.60 corresponds to the transmission destination. The second record also indicates that the protocol in the fourth layer in this connection is TCP.

A third record in this example indicates that for a connection to which a connection ID of CN-03 is assigned, the port number 4000 in a host apparatus with an IP address of 30.40.50.60 corresponds to the transmission source and that the port number 3000 in a host apparatus with an IP address of 40.50.60.70 corresponds to the transmission destination. The third record also indicates that the protocol in the fourth layer in this connection is UDP.

Figure 4:
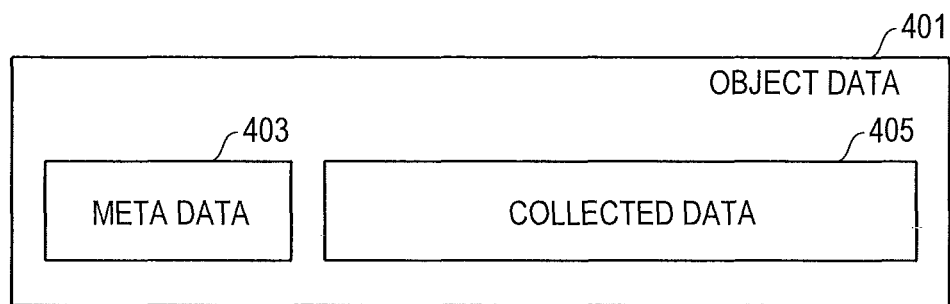
FIG. 4 illustrates an example of the structure of an object data in the first embodiment.

Next, object data stored in the object data storage unit 143 will be described. FIG. 4 illustrates an example of the structure of an object data in the first embodiment. The object data 401 in this example includes meta data 403 and collected data 405. The collected data 405 is data obtained by collecting sorted packets. The meta data 403 includes data related to a property (connection, for example) that has been used as a key in sorting and data related to the collected data 405. The collected data 405 alone (excluding the meta data 403) may be referred to as an object data.

Figure 5:
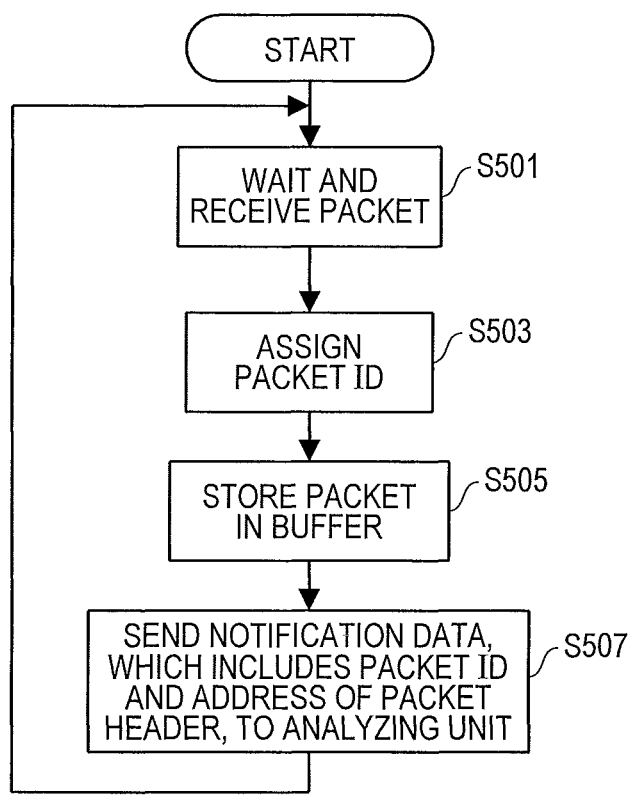
FIG. 5 illustrates a flow of assignment processing.

Processing in the network monitoring apparatus 101 will be described below. FIG. 5 illustrates a flow of assignment processing executed by the driver 113. The driver 113 waits and receives a packet from the NIC 111 (S501). Upon reception of a packet from the NIC 111, the driver 113 assigns a packet ID to the received packet (S503). The driver 113 then stores the packet in the buffer 115 (S505). The driver 113 also sends notification data, which includes the packet ID and the address of a packet header, to the analyzing unit 117 (S507).

Figure 6:
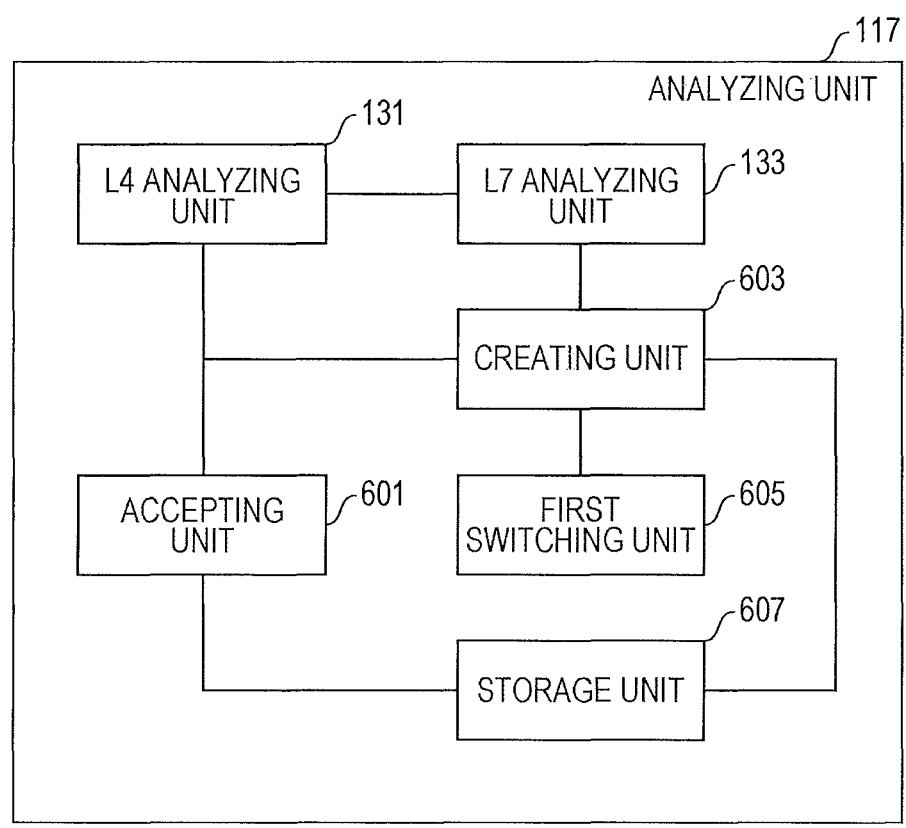
FIG. 6 illustrates an example of the structure of an analyzing unit.

FIG. 6 illustrates an example of the structure of the analyzing unit 117. In addition to the L4 analyzing unit 131 and L7 analyzing unit 133, the analyzing unit 117 includes an accepting unit 601, a creating unit 603, a first switching unit 605, and a storage unit 607. The accepting unit 601 accepts notification data from the driver 113. The creating unit 603 creates index data and data related to sorting (a connection table, for example). The first switching unit 605 switches between areas in which an index table to which to write the index data is stored. The storage unit 607 stores data that is used in the interior of the analyzing unit 117.

Figure 7A:
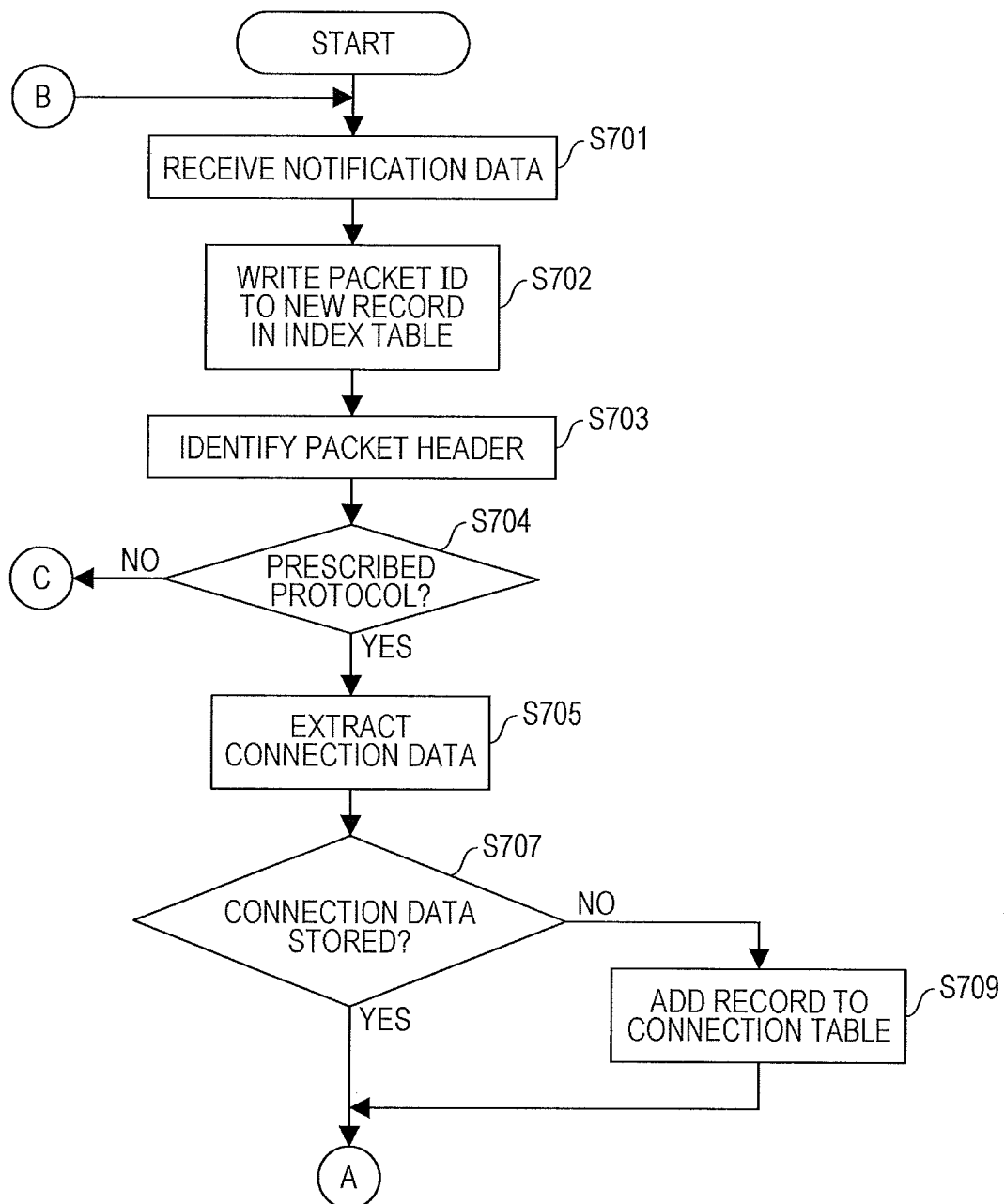
FIG. 7A illustrates a flow of processing, in the first embodiment, executed by the analyzing unit.

FIG. 7A illustrates a flow of processing, in the first embodiment, executed by the analyzing unit 117. When the accepting unit 601 receives the notification data from the driver 113 (S701), the creating unit 603 writes the packet ID obtained from the notification data to a new record in the index table (S702). The L4 analyzing unit 131 identifies a packet header from an address included in the notification data (S703). The L4 analyzing unit 131 decides whether the protocol of the packet is a prescribed protocol (S704). Prescribed protocols are, for example, TCP and UDP. If the L4 analyzing unit 131 decides that the protocol of the packet is not a predetermined protocol (the result in S704 is No), the sequence proceeds to S713 in FIG. 7B. In this case, the connection ID field in the new record is left unset.

If the L4 analyzing unit 131 decides that the protocol of the packet is a predetermined protocol (the result in S704 is Yes), the L4 analyzing unit 131 extracts connection data from the packet header (S705). The connection data includes a transmission source IP address, a transmission source port number, a transmission destination IP address, a transmission destination port number, and a protocol number. The creating unit 603 decides whether the connection data has been stored in the connection table (in FIG. 3) (S707). If the creating unit 603 decides that the connection data has been stored in the connection table (the result in S707 is Yes), the sequence proceeds to S711 in FIG. 7B.

If the creating unit 603 decides that the connection data has not yet been stored in the connection table (the result in S707 is No), the creating unit 603 adds a record to the connection table (S709). In the added record, a new connection ID and the connection data are set. Specifically, a connection ID, a transmission source IP address, a transmission source port number, a transmission destination IP address, a transmission destination port number, and a protocol number are set. Upon completion of processing in S709, the sequence proceeds to S711 in FIG. 7B.

The creating unit 603 records the connection ID in the record (S711). The connection ID is identified with reference to the connection table.

Then, the L4 analyzing unit 131 executes L4 analysis processing (S713). The L7 analyzing unit 133 executes L7 analysis processing (S715). L4 analysis processing and L7 analysis processing are the same as conventional processing, so their descriptions will be omitted.

The first switching unit 605 decides whether a time to change index table has been reached (S717). When, for example, the number of records stored in the index table has reached a prescribed reference value, the first switching unit 605 decides that a time to change the index table has been reached. Alternatively, when a prescribed period has passed from the previous switchover, the first switching unit 605 decides that a time to change the index table has been reached.

If the first switching unit 605 decides that a time to change the index table has been reached (the result in S717 is Yes), the first switching unit 605 between areas in which an index table to which to write index data is stored (S719). To have the storage processing unit 125 switch, at the same time, between areas in which an index table from which to read index data is stored, the first switching unit 605 sends a switchover command to the storage processing unit 125 (S721).

If a switchover is made between the index tables in this way, the area to which the analyzing unit 117 writes index data and an area from which the storage processing unit 125 reads index data differ from each other at all times, so concurrent processing that takes advantage of a multi-core processor can be achieved by a lock-free algorithm. If, for example, the storing of some object data is delayed due to a wait for the storage apparatus 109 to complete processing, an effect on the entire processing is suppressed. It is also possible to suppress data from being lost until a recovery is made.

Figure 7B:
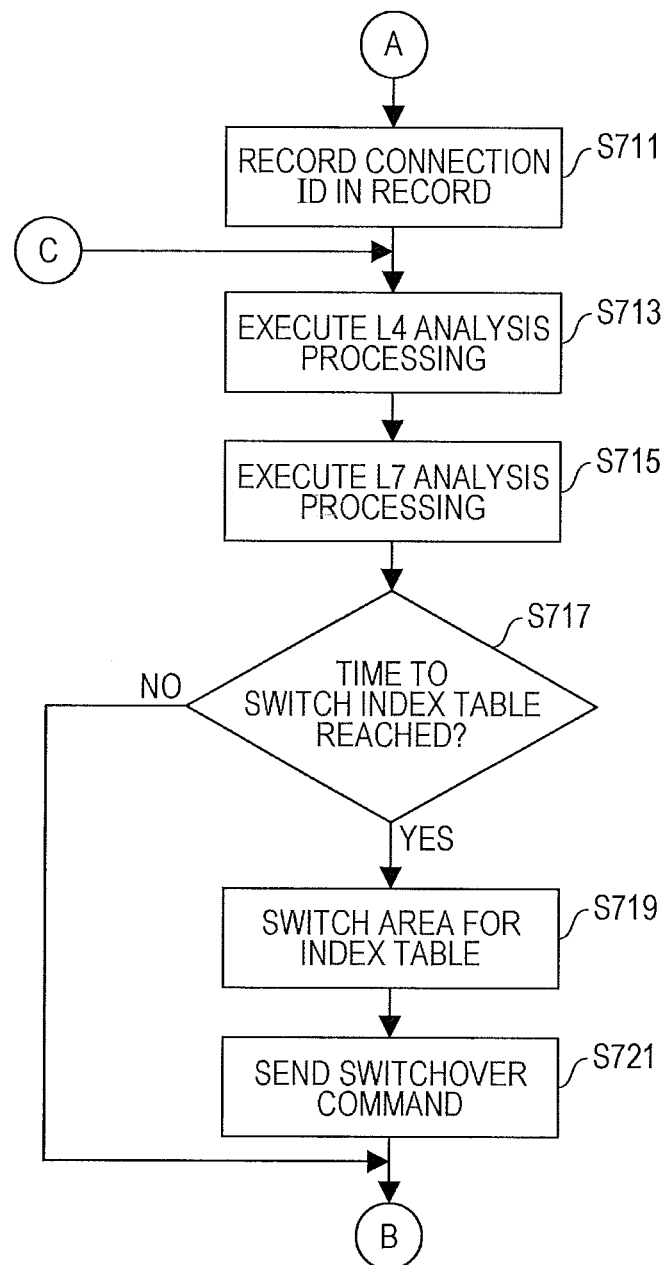
FIG. 7B illustrates a flow of processing, in the first embodiment, executed by the analyzing unit.

Upon completion of the processing in FIG. 7B, the sequence returns to S701 in FIG. 7A and repeats the processing described above.

Next, the storage processing unit 125 will be described.

Figure 8:
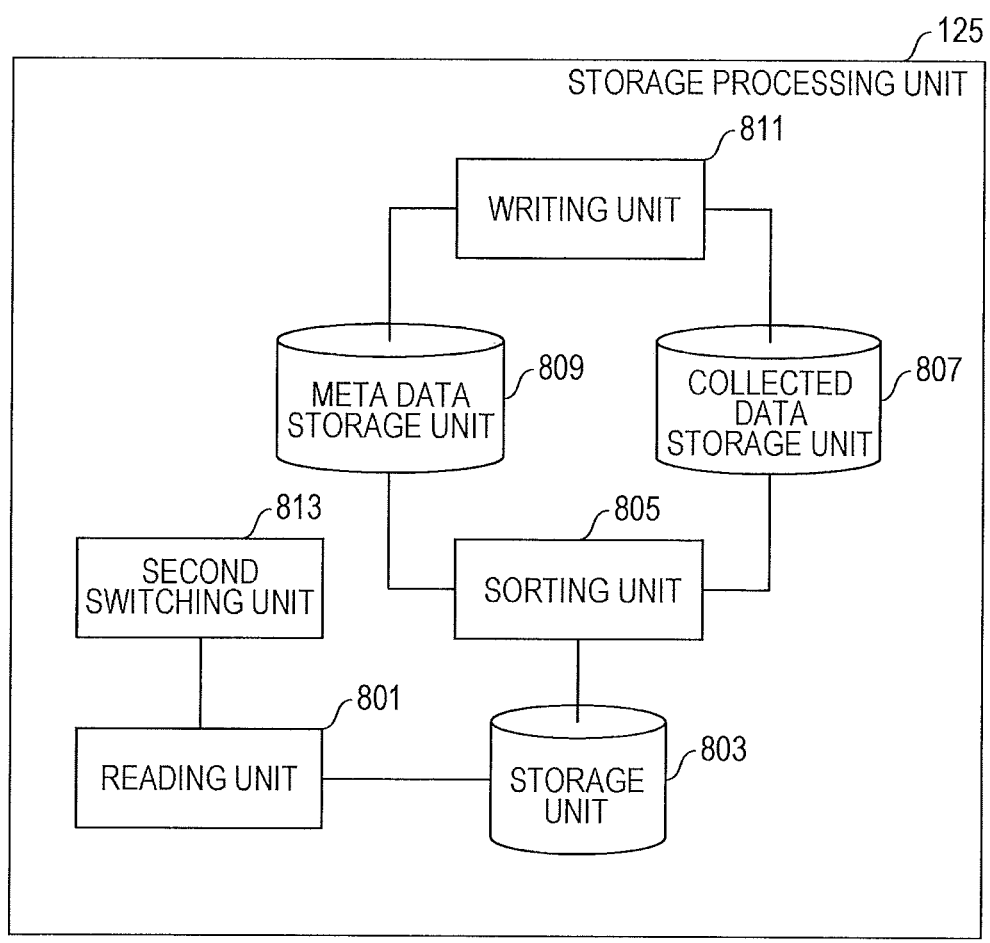
FIG. 8 illustrates an example of the structure of a storage processing unit.

FIG. 8 illustrates an example of the structure of the storage processing unit 125. The storage processing unit 125 includes a reading unit 801, a storage unit 803, a sorting unit 805, a collected data storage unit 807, a meta data storage unit 809, a writing unit 811, and a second switching unit 813. The reading unit 801 reads out index data from the index data storage unit 121. The storage unit 803 temporarily stores the read-out index data. The sorting unit 805 sorts a packet according to the index data. The collected data storage unit 807 stores collected data in which sorted packets are linked. The meta data storage unit 809 stores meta data 403 related to collected data 405. The writing unit 811 writes the collected data 405 and meta data 403 to the object data storage unit 143. The second switching unit 813 switches between areas in which an index table from which to read index data is stored.

Figure 9:
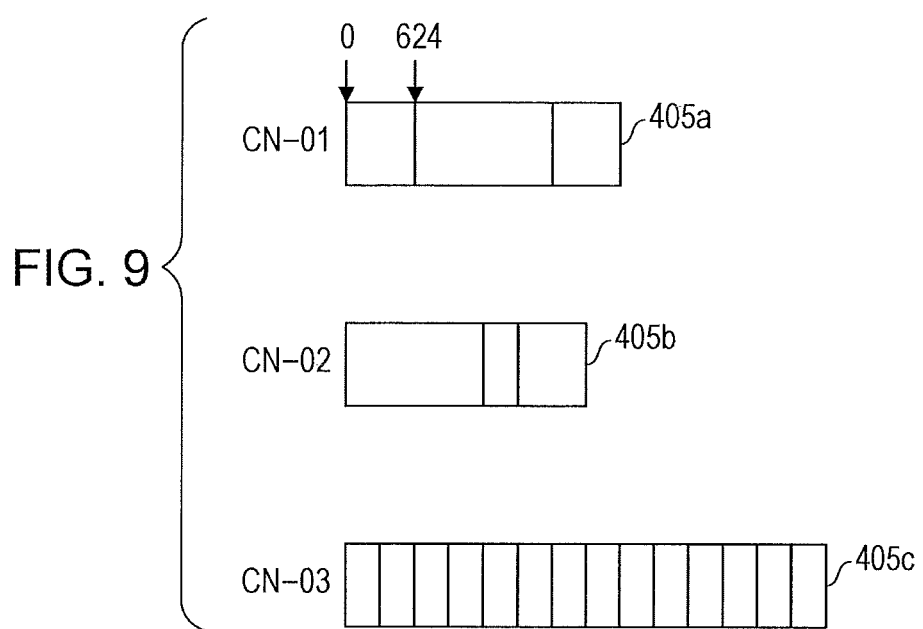
FIG. 9 illustrates examples of collected data in the first embodiment.

The collected data 405 stored in the collected data storage unit 807 will be described. FIG. 9 illustrates examples of collected data 405 in the first embodiment. In each collected data item in these examples, packets related to the same connection are linked. In collected data 405a, three packets related to a connection ID of CN-01 are linked. The offset of the first packet at its beginning is 0, and the offset of the second packet at its beginning is 624. In collected data 405b, three packets related to a connection ID of CN-02 are linked. In collected data 405c, 14 packets related to a connection ID of CN-03 are linked.

Next, meta data 403 stored in the meta data storage unit 809 will be described. FIG. 10 illustrates an example of meta data 403 in the first embodiment. Meta data 403 is set in correspondence to collected data 405. The meta data 403 in FIG. 10 corresponds to the collected data 405a in FIG. 9. The meta data 403 has a header section and a table section.

The header section has a field in which a connection ID is set and a field in which connection data is set. The field in which connection data is set includes a field in which a transmission source IP address is set, a field in which a transmission source port number is set, a field in which a transmission destination IP address is set, a field in which a transmission destination port number is set, and a field in which a protocol number is set.

The header section in this example indicates that this meta data corresponds to the collected data 405a of a packet related to a connection with a connection ID of CN-01. The header section in this example also indicates that, in this connection, the port number 2000 in a host apparatus with an IP address of 10.20.30.40 corresponds to the transmission source and that the port number 20 in a host apparatus with an IP address of 10.20.30.50 corresponds to the transmission destination. The header section in this example also indicates that the protocol in the fourth layer in this connection is TCP because the protocol number is 6.

In the table section, packet-specific records included in the collected data are set. Each record includes a field in which a packet ID is set and a field in which an offset is set. In the table section in this example, a first packet is identified by a packet ID of PC-001 and is stored starting from an offset of 0. A second packet is identified by a packet ID of PC-006 and is stored starting from an offset of 624.

As for the collected data 405b and collected data 405c in FIG. 9 as well, meta data 403 is similarly set.

Figure 11:
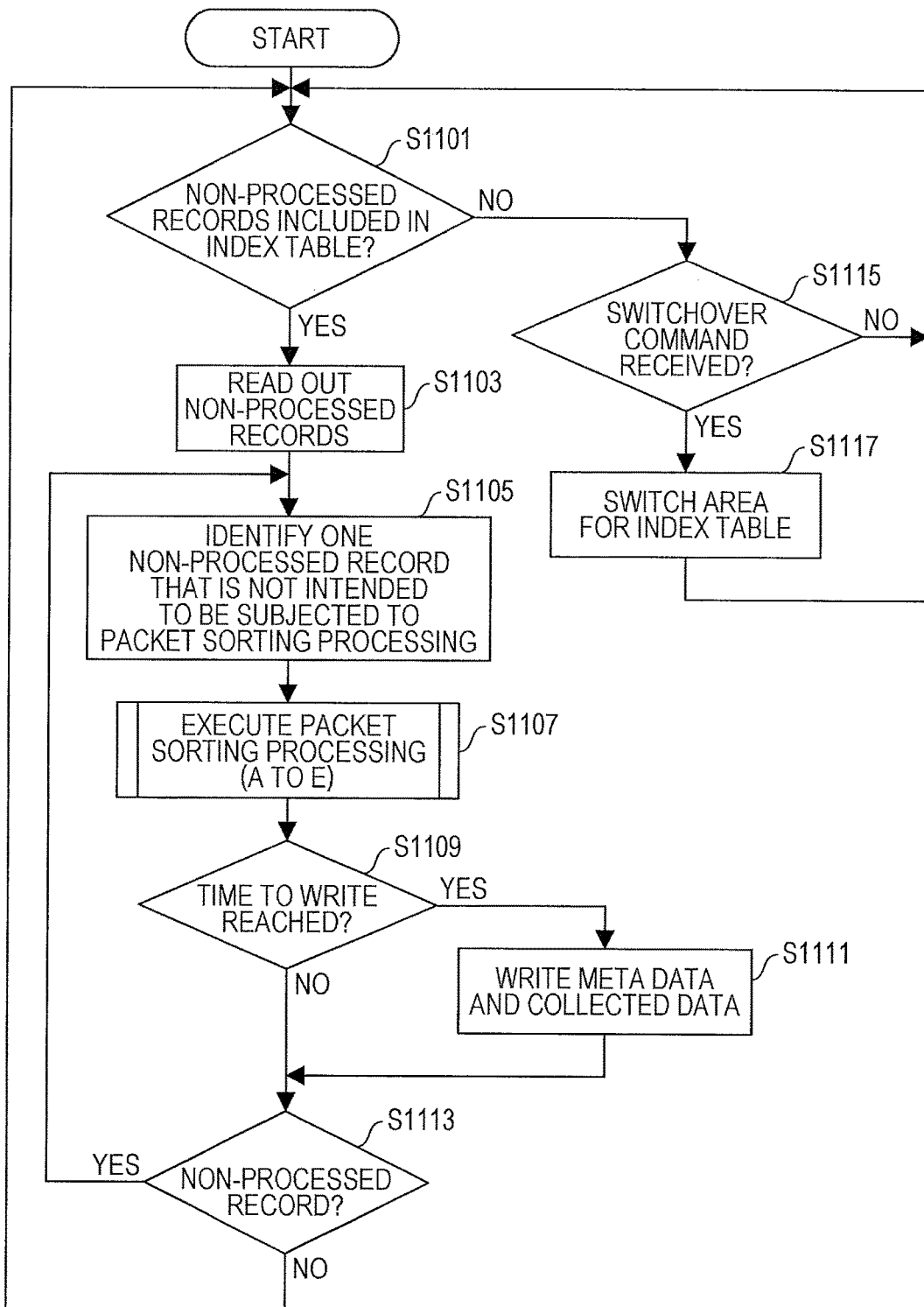
FIG. 11 illustrates a flow of processing, in the first embodiment, executed by the storage processing unit.

Next, processing executed by the storage processing unit 125 will be described. FIG. 11 illustrates a flow of processing, in the first embodiment, executed by the storage processing unit 125. The reading unit 801 decides whether non-processed records are included in the index table from which records are read out (S1101). A non-processed record is index data that has not been sorted.

If the reading unit 801 decides that non-processed records are included in the index table (the result in S1101 is Yes), the reading unit 801 reads out the non-processed records and stores them in the storage unit 803 (S1103).

The sorting unit 805 performs packet sorting processing for each read-out record. In this processing, the sorting unit 805 first identifies one non-processed record that is not intended to be subjected to packet sorting processing (S1105). The sorting unit 805 then executes packet sorting processing on the identified packet (S1107). Packet sorting processing includes packet sorting processing (A) to packet sorting processing (E), which will be successively described below.

Figure 12:
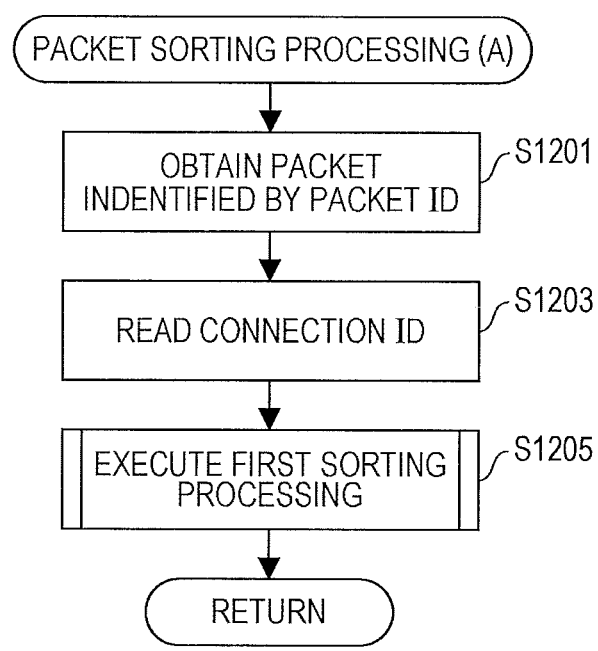
FIG. 12 illustrates a flow of packet sorting processing (A)

FIG. 12 illustrates a flow of packet sorting processing (A). The sorting unit 805 obtains, from the buffer 115, a packet identified by the packet ID in the record (S1201). The sorting unit 805 reads the connection ID of the record (S1203) and executes the first sorting processing in FIG. 13 (S1205).

Figure 13:
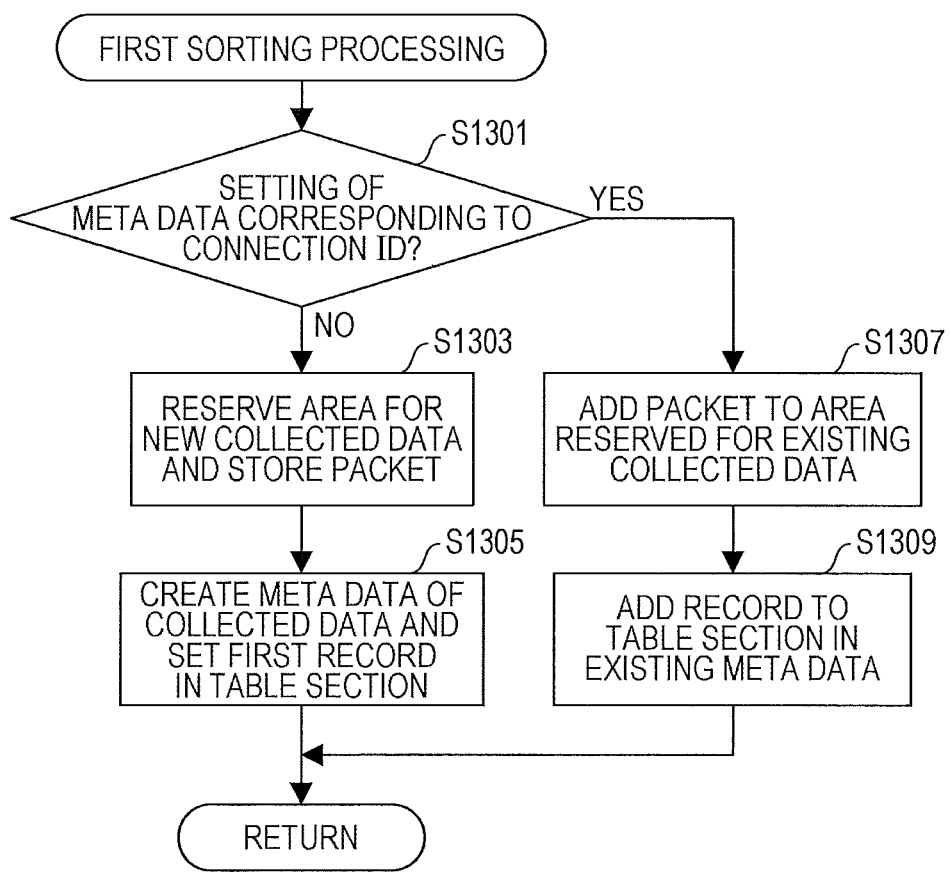
FIG. 13 illustrates a flow of first sorting processing.

FIG. 13 illustrates a flow of first sorting processing. The sorting unit 805 decides whether meta data corresponding to the connection ID has been set (S1301). Specifically, the sorting unit 805 decides whether the connection ID has been set in any meta data stored in the meta data storage unit 809.

If the sorting unit 805 decides that no meta data corresponding to the connection ID has not been set (the result in S1301 is No), the sorting unit 805 first reserves, in the collected data storage unit 807, an area for new collected data 405 and sets the packet at the top of the area (S1303).

The sorting unit 805 then creates meta data 403 of the collected data 405 in the meta data storage unit 809. The connection ID and the connection data obtained from the connection table are set in the header section in the meta data

403. The sorting unit 805 also sets a first record in the table section in the meta data 403 (S1305). A packet ID and an offset that indicates the beginning of the packet are set in the record.

If the sorting unit 805 decides that meta data corresponding to the connection ID has been set (the result in S1301 is Yes), collected data and meta data related to the connection ID are already present. The sorting unit 805 adds a packet to an area reserved for the existing collected data 405 (S1307). The sorting unit 805 also adds a record to the table section in the existing meta data 403 (S1309). A packet ID and an offset that indicates the beginning of the packet are set in the record.

A packet in which a connection ID has not been set may be collected. In this case, collected data and meta data for a packet not applicable to a prescribed protocol are created. All fields in the header section in the meta data for a packet not applicable to a prescribed packet are left unset. In the first sorting processing, for example, the sorting unit 805 decides whether a connection ID has been set. If the sorting unit 805 decides that a connection ID has not been set, the sorting unit 805 adds the packet to the collected data for a packet not applicable to a prescribed packet and adds a record to the meta data for a packet not applicable to a prescribed packet.

Upon completion of the first sorting processing, the packet sorting processing (A) in FIG. 12 is also terminated, returning to the processing in FIG. 11. The writing unit 811 decides whether a time to write has been reached (S1109). When, for example, the amount of data stored in the collected data storage unit 807 exceeds a reference, the writing unit 811 decides that a time to write has been reached. Alternatively, when a prescribed period has passed from the previous writing, the writing unit 811 may decide that a time to write has been reached.

If the writing unit 811 decides that a time to write has been reached (the result in S1109 is Yes), the writing unit 811 writes the meta data 403 and collected data 405 to the object data storage unit 143 (S1111). In this case, the writing unit 811 may write meta data 403 stored in the meta data storage unit 809 and collected data 405 stored in the collected data storage unit 807 without alteration. Alternatively, the writing unit 811 may write the meta data 403 and collected data 405 together in object data units. In either case, it is desirable for the meta data 403 and collected data 405 to be mutually related and maintain a logical structure of an object data (in FIG. 4).

The sorting unit 805 decides whether there is a non-processed record (S1113). If the sorting unit 805 decides that there is a non-processed record (the result in S1113 is Yes), the sequence returns to S1105 and the processing in S1105 and later is repeated.

If the sorting unit 805 decides that there is no non-processed record (the result in S1113 is No), the sequence returns to S1101 and the processing in S1101 and later is repeated.

If the reading unit 801 decides in S1101 that non-processed records are not included in the index table (the result in S1101 is No), the second switching unit 813 decides whether a switchover command has been received from the first switching unit 605 in the analyzing unit 117 (S1115). If the second switching unit 813 decides that a switchover command has been received from the first switching unit 605 in the analyzing unit 117 (the result in S1115 is Yes), the second switching unit 813 switches between areas in which an index table from which the sorting unit 805 reads index data is stored (S1117).

According to the first embodiment, it is possible to reduce a processing load involved in storing a plurality of packets captured according to their properties. Since, for example, a complicated procedure such as in list analysis is not used, processing can be performed with a small amount of resources under a small load.

Since a packet ID is included in the meta data in each object data, a sequence in which packets have been captured can be identified. This is useful when, for example, the sequence of packets is changed in the order in which they have been captured.

When packets are collected for each connection, processing to identify the connection of a packet and processing to sort the packet according to its connection and then store the sorted packet are separately performed, so processing loads can be distributed.

Since areas in which an index table is stored can be synchronously switched, it is possible to avoid problems caused by an insufficient area during the storage of index data and by a wait for a storage unit to complete processing.

Second Embodiment

In the second embodiment, an example will be described in which collected data items for which a combination of a packet transmission source apparatus and a packet transmission destination apparatus is the same are stored together.

The structure of the network monitoring system is the same as in the first embodiment.

Figure 14:
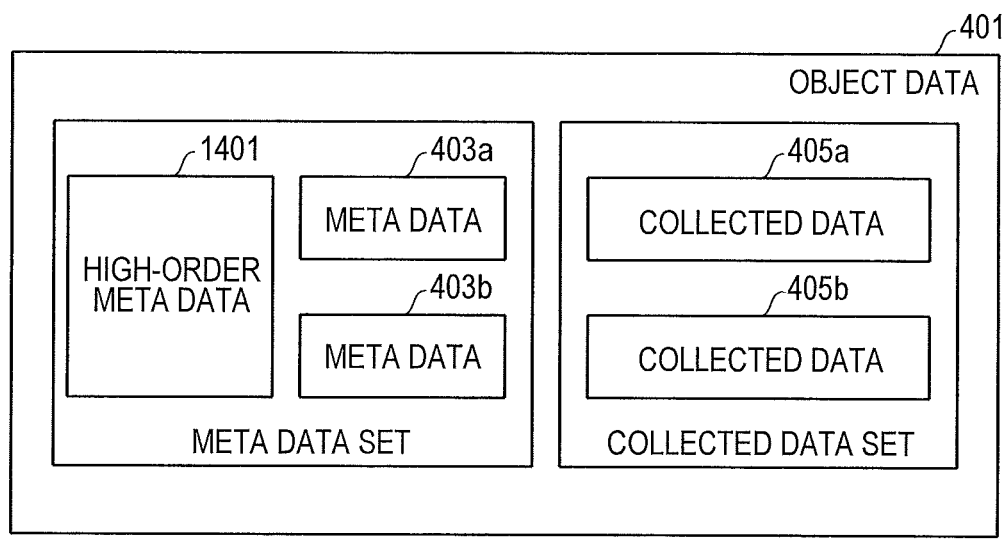
FIG. 14 illustrates an example of the structure of an object data in a second embodiment.

FIG. 14 illustrates an example of the structure of an object data 401 in the second embodiment. The object data 401 in the second embodiment includes a plurality of collected data items 405. A set of a plurality of collected data items is referred to as a collected data set.

In the second embodiment, high-order meta data 1401 mutually correlates meta data items corresponding to collected data items 405 included in a collected data set. A combination of the high-order meta data 1401 and a set of meta data items 403 is referred to as a meta data set. The meta data 403a in FIG. 14 is related to the collected data 405a, and the meta data 403b in FIG. 14 is related to the collected data 405b.

Next, an index table in the second embodiment will be described. FIG. 15 illustrates an example of an index table in the second embodiment. For each packet, the property of the packet is set in the index table as in FIG. 2. In this example, a host combination ID is set as a property of the packet besides the connection ID. The host combination ID is an identifier that identifies a combination of a host apparatus used as a transmission source and a host apparatus used as a transmission destination.

A first record in this example indicates that a connection related to a packet to which a packet ID of PC-011 has been assigned is identified by a connection ID of CN-11 and that a host combination related to the packet is identified by a host combination ID of HtoH-01.

A second record in this example indicates that a connection related to a packet to which a packet ID of PC-012 has been assigned is identified by a connection ID of CN-12 and that a host combination related to the packet is identified by a host combination ID of HtoH-01.

A third record in this example indicates that a connection related to a packet to which a packet ID of PC-013 is assigned record is identified by a connection ID of CN-12 and that a host combination related to the packet is identified by a host combination ID of HtoH-01.

A fourth record in this example indicates that a connection related to a packet to which a packet ID of PC-014 has been assigned is identified by a connection ID of CN-13 and that a host combination related to the packet is identified by a host combination ID of HtoH-02.

A fifth record in this example indicates that a connection related to a packet to which a packet ID of PC-015 has been assigned is identified by a connection ID of CN-13 and that a host combination related to the packet is identified by a host combination ID of HtoH-02.

A sixth record in this example indicates that a connection related to a packet to which a packet ID of PC-016 has been assigned is identified by a connection ID of CN-11 and that a host combination related to the packet is identified by a host combination ID of HtoH-01.

Next, a connection table in the second embodiment will be described. FIG. 16 illustrates an example of the connection table in the second embodiment. The structure of the connection table is as illustrated in FIG. 3.

A first record in this example indicates that for a connection to which a connection ID of CN-11 is assigned, the port number 2000 in a host apparatus with an IP address of 10.20.30.40 corresponds to the transmission source and that the port number 80 in a host apparatus with an IP address of 20.30.40.50 corresponds to the transmission destination. The first record also indicates that the protocol in the fourth layer in this connection is TCP.

A second record in this example indicates that for a connection to which a connection ID of CN-12 is assigned, the port number 2100 in a host apparatus with an IP address of 10.20.30.40 corresponds to the transmission source and that the port number 80 in a host apparatus with an IP address of 20.30.40.50 corresponds to the transmission destination. The second record also indicates that the protocol in the fourth layer in this connection is TCP.

A third record in this example indicates that for a connection to which a connection ID of CN-13 is assigned, the port number 2100 in a host apparatus with an IP address of 30.40.50.60 corresponds to the transmission source and that the port number 80 in a host apparatus with an IP address of 20.30.40.50 corresponds to the transmission destination. The third record also indicates that the protocol in the fourth layer in this connection is TCP.

In the second embodiment, a host combination table is stored in the sorted data storage unit 123 besides the connection table described above. FIG. 17 illustrates an example of a host combination table. In the host combination table, data defining a host combination is set for each host combination. The host combination table includes records in host combination units. Each record has a field in which a host combination ID is set, a field in which a transmission source IP address is set, and a field in which a transmission destination IP address is set. Although, in this example, a host combination is defined by a transmission source IP address and a transmission destination IP address, a host combination may be defined other data.

A first record in this example indicates that a host combination ID of HtoH-01 is assigned to a combination of a transmission source host apparatus with an IP address of 10.20.30.40 and a transmission destination host apparatus with an IP address of 20.30.40.50.

A second record in this example indicates that a host combination ID of HtoH-02 is assigned to a combination of a transmission source host apparatus with an IP address of 30.40.50.60 and a transmission destination host apparatus with an IP address of 20.30.40.50.

The flow (in FIG. 5) of assignment processing executed by the driver 113 is the same as in the first embodiment described above.

The structure (in FIG. 6) of the analyzing unit 117 is also the same as in the first embodiment described above.

Figure 18:
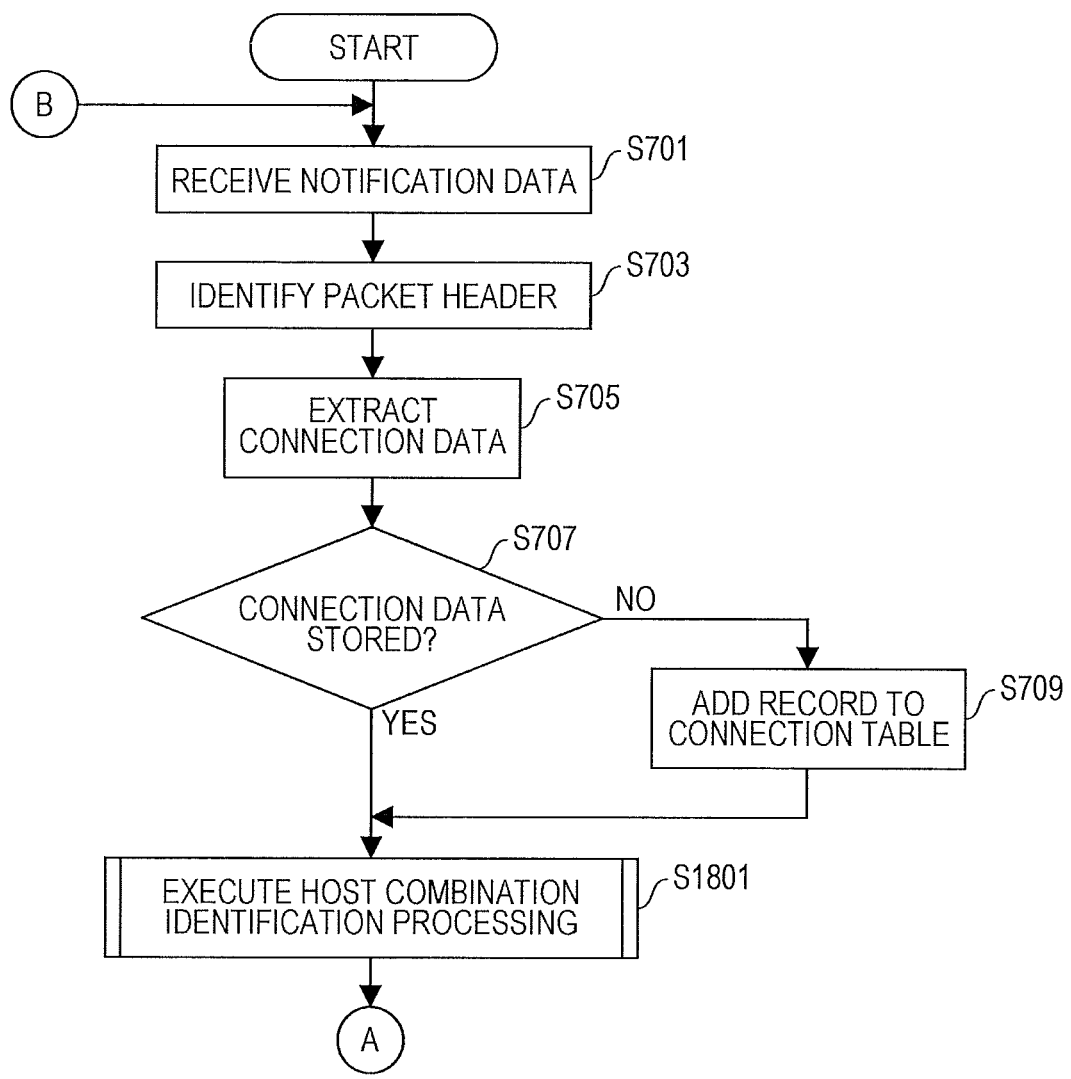
FIG. 18 illustrates a flow of processing, in the second embodiment, executed by the analyzing unit.

Processing in the analyzing unit 117 in the second embodiment will be described. FIG. 18 illustrates a flow of processing, in the second embodiment, executed by the analyzing unit 117. S701 to S709 in FIG. 18 are the same as in the first embodiment described above.

In the second embodiment, if the creating unit 603 decides in S707 that the connection data has been stored in the connection table (the result in S707 is Yes) or after processing in S709 has been completed, the creating unit 603 executes host combination identification processing (S1801).

Figure 19:
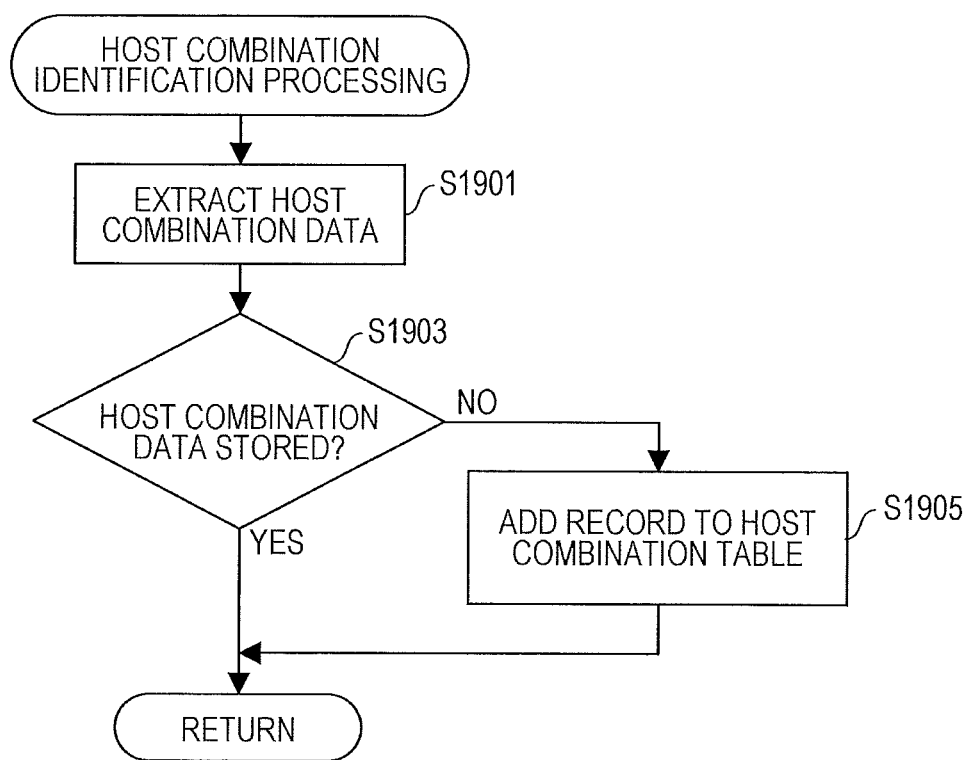
FIG. 19 illustrates a flow of host combination identification processing.

FIG. 19 illustrates a flow of host combination identification processing. The creating unit 603 extracts host combination data from the packet header (S1901). The host combination data includes a transmission source IP address and a transmission destination IP address. The creating unit 603 decides whether the host combination data has been stored in the host combination table (in FIG. 17) (S1903).

If the creating unit 603 decides that the host combination data has been stored in the host combination table (the result in S1903 is Yes), the creating unit 603 terminates the host combination identification processing.

If the creating unit 603 decides that the host combination data has not yet been stored in the host combination table (the result in S1903 is No), the creating unit 603 adds a record to the host combination table (S1905). In the added record, a new host combination ID, transmission source IP address, and transmission destination IP address are set.

Upon completion of the host combination identification processing (S1801 in FIG. 18), the sequence returns to S711 in FIG. 7B.

A packet ID, a connection ID, and a host combination ID are set in a record that the creating unit 603 adds to the index table in S711. The host combination ID is identified according to the host combination table. Processing in S713 to S721 in FIG. 7B is the same as in the first embodiment described above.

Figure 20:
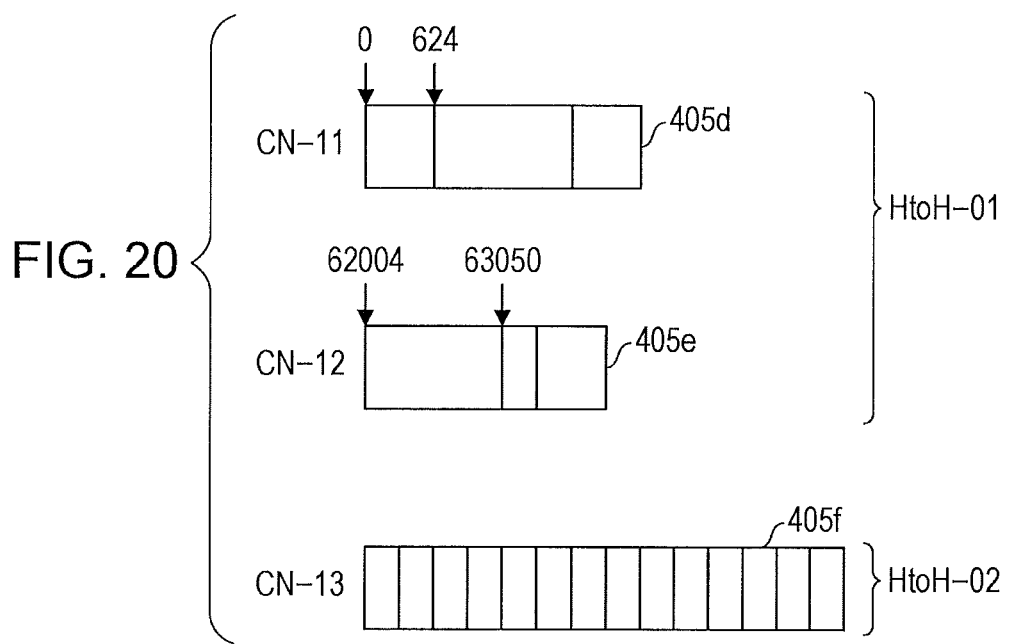
FIG. 20 illustrates examples of collected data in the second embodiment.

Next, collected data 405 in the second embodiment will be described. FIG. 20 illustrates examples of the collected data 405 in the second embodiment. In the collected data in these examples as well, packets related to the same connection are linked. In collected data 405*d*, three packets related to a connection ID of CN-11 are linked. The offset of the first packet at its beginning is 0, and the offset of the second packet at its beginning is 624. In collected data 405*e*, three packets related to a connection ID of CN-12 are linked. The offset of the first packet at its beginning is 62004, and the offset of the second packet at its beginning is 63050. In collected data 405*f*, 14 packets related to a connection ID of CN-13 are linked.

The collected data 405*d* and collected data 405*e* are the same in that their host combination IDs are HtoH-01. In the second embodiment, the collected data 405*d* and collected data 405*e* having the same host combination ID are handled together. The host combination ID of the collected data 405*f* is HtoH-02, so the collected data 405*f* is handled independently.

Next, the meta data 403 in the second embodiment will be described. FIG. 21 illustrates an example of meta data 405*d* corresponding to the collected data 405*d* illustrated in FIG. 20. The header section in this example indicates that this meta data corresponds to the collected data 405*d* of packets related to a connection ID of CN-11. The header section in this example also indicates that, in this connection, the port number 2000 in a host apparatus with an IP address of 10.20.30.40 corresponds to the transmission source and the port number 80 in a host apparatus with an IP address of 20.30.40.50 corresponds to the transmission destination. The header section in this example also indicates that the protocol in the fourth layer in this connection is TCP.

A first packet in the table section in this example indicates that the packet is identified by a packet ID of PC-011 and that a relative offset of 0 has been stored at the beginning. The relative offset indicates a position relative to the beginning of the collected data, the offset at the beginning being 0. A second packet indicates that it is identified by a packet ID of PC-016 and that a relative offset of 624 has been stored at the beginning.

FIG. 22 illustrates an example of meta data 405e corresponding to the collected data 405e illustrated in FIG. 20. The header section in this example indicates that this meta data corresponds to the collected data 405e of packets related to a connection with a connection ID of CN-12 . The header section in this example also indicates that, in this connection, the port number 2100 in a host apparatus with an IP address of 10.20.30.40 corresponds to the transmission source and the port number 80 in a host apparatus with an IP address of 20.30.40.50 corresponds to the transmission destination. The header section in this example also indicates that the protocol in the fourth layer in this connection is TCP.

A first packet in the table section in this example indicates that the packet is identified by a packet ID of PC-012 and that a relative offset of 0 has been stored at the beginning. The second packet indicates that it is identified by a packet ID of PC-013 and that a relative offset of 1046 has been stored at the beginning.

Figures 23, 24:
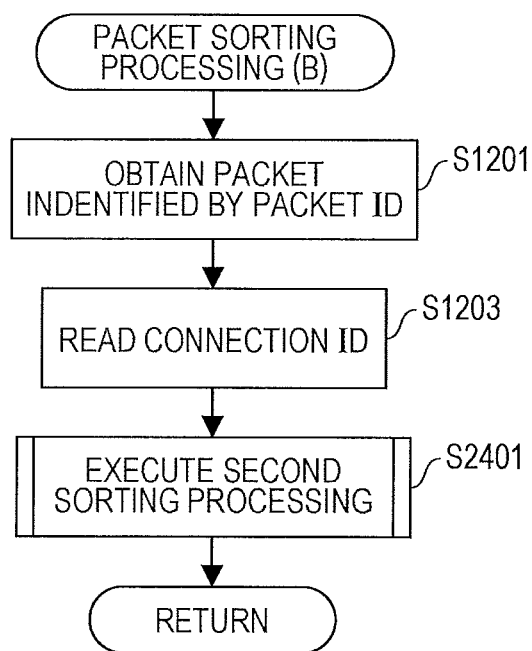
FIG. 23 illustrates an example of high-order meta data in the second embodiment.
FIG. 24 illustrates a flow of packet sorting processing (B)

Next, the high-order meta data 1401 stored in the meta data storage unit 809 will be described. FIG. 23 illustrates an example of high-order meta data 1401 in the second embodiment. The high-order meta data 1401 has a header section and a table section. The header section has a field in which a host combination ID is set, a field in which a transmission source IP address is set, and a field in which a transmission destination IP address is set. The host combination ID is an example of an identifier related to a property by which the collected data 405 is mutually correlated.

Each record in the table section has a field in which a connection ID is set and a field in which a start offset is set. A first record in the table section in this example indicates that first meta data 403d is identified by a connection ID of CN-11 and that first collected data 405d is stored starting from an offset of 0 in the collected data storage unit 807. A second record in the table section in this example indicates that second meta data 403e is identified by a connection ID of CN-12 and that second collected data 405e is stored starting from an offset of 62004 in the collected data storage unit 807.

The structure of the storage processing unit 125 is the same as in the first embodiment described above.

Processing by the storage processing unit 125 is as illustrated in FIG. 11. Processing in S1101 to S1105 is the same as in the first embodiment described above. In the second embodiment, the sorting unit 805 executes packet sorting processing (B) in S1107.

FIG. 24 illustrates a flow of packet sorting processing (B). Processing in S1201 and S1203 is the same as in packet sorting processing (A) in FIG. 12. The sorting unit 805 executes second sorting processing (S2401).

Figure 25:
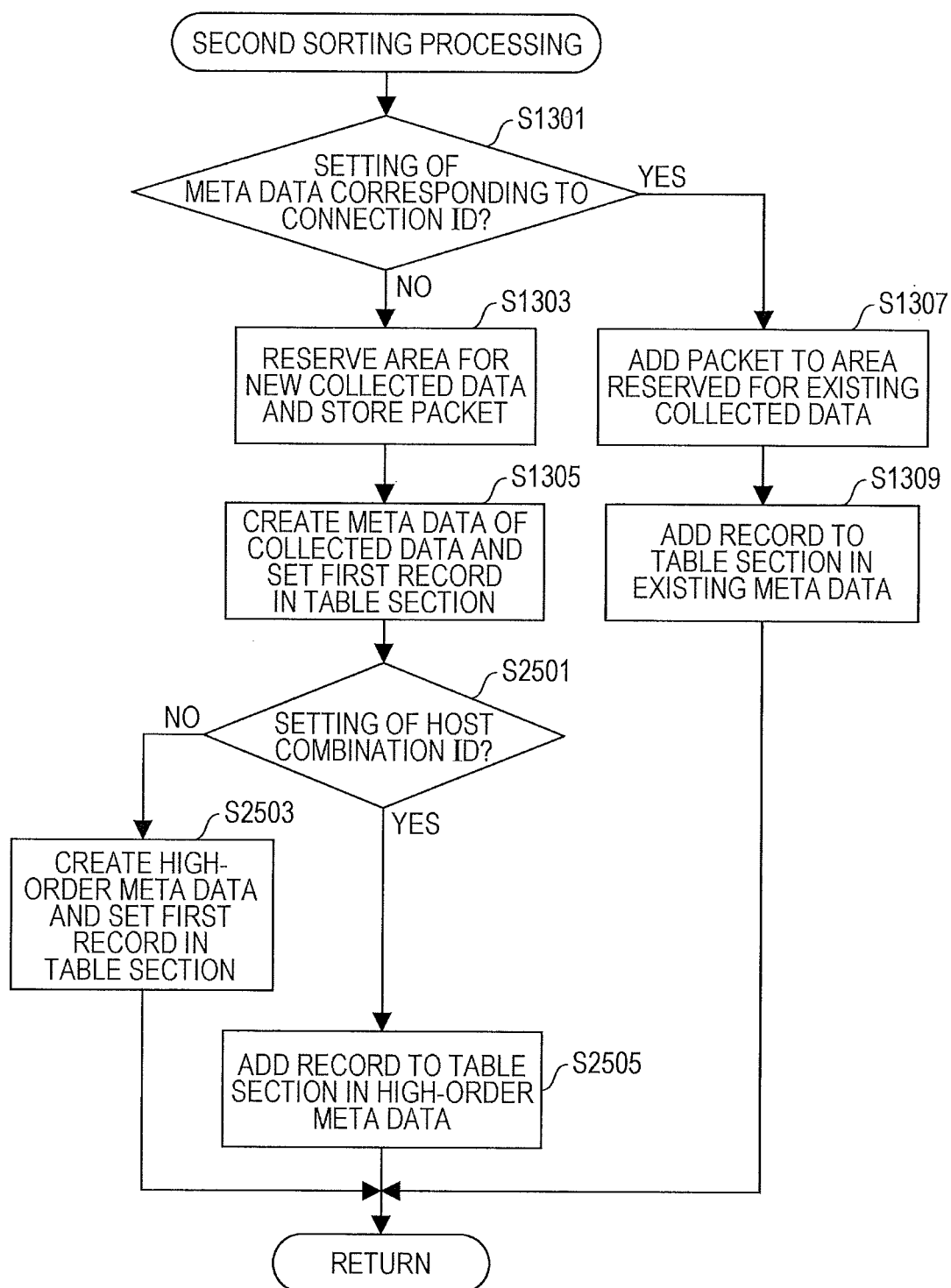
FIG. 25 illustrates a flow of second sorting processing.

FIG. 25 illustrates a flow of second sorting processing. Processing in S1301 to S1309 is the same as in the first sorting processing in FIG. 13.

After processing in S1305, the sorting unit 805 decides whether high-order meta data 1401 corresponding to the relevant host combination ID has been set (S2501). Specifically, the sorting unit 805 identifies the host combination ID included in the record identified in S1105 and decides whether the host combination ID has been set in any high-order meta data 1401 stored in the meta data storage unit 809.

If the sorting unit 805 decides that high-order meta data 1401 corresponding to the relevant host combination ID has not been set (the result in S2501 is No), the sorting unit 805 creates high-order meta data 1401 in the meta data storage unit 809. A host combination ID, a transmission source IP address, and a transmission destination IP address are set in the header section in the high-order meta data 1401. The transmission source IP address and transmission destination IP address are obtained from the host combination table. The sorting unit 805 also sets a first record in the table section (S2503). A connection ID and an offset that indicates the top position of the collected data 405 are set in the record.

If the sorting unit 805 decides that high-order meta data 1401 corresponding to the relevant host combination ID has been set (the result in S2501 is Yes), the sorting unit 805 adds a record to the table section of the high-order meta data 1401 (S2505). A connection ID and an offset that indicates the top position of the collected data 405 are set in the record.

Upon completion of the second sorting processing, the packet sorting processing (B) in FIG. 24 is also terminated, returning to the processing in S1109 in FIG. 11. Processing in S1109 to S1117 in FIG. 11 is the same as in the first embodiment described above.

According to the second embodiment, packets that have been sorted according to a certain property (connection, for example) can be further handled in correlation with another property. This is useful in, for example, analyzing packets related to a certain property and another property.

Specifically, some of packets that have been sorted according to a certain property can be further handled together according to a combination of a packet transmission source apparatus and a packet transmission destination apparatus.

Third Embodiment

In the third embodiment, an example will be described in which collected data items for which a combination of a packet transmission source subnetwork and a packet transmission destination subnetwork is the same are stored together.

The structure of the network monitoring system is the same as in the first and second embodiments described above. The structure of the object data 401 is the same as in the second embodiment.

FIG. 26 illustrates an example of an index table in the third embodiment. For each packet, the property of the packet is set in the index table as in the first and second embodiments described above. In this example, a subnet combination ID is set as a property of the packet besides the connection ID. The subnet combination ID is an identifier that identifies a combination of a subnetwork used as a transmission source and a subnetwork used as a transmission destination.

A first record in this example indicates that a connection related to a packet to which a packet ID of PC-011 has been assigned is identified by a connection ID of CN-11 and that a subnet combination related to the packet is identified by a subnet combination ID of StoS-01.

A second record in this example indicates that a connection related to a packet to which a packet ID of PC-012 has been assigned is identified by a connection ID of CN-12 and that a subnet combination related to the packet is identified by a subnet combination ID of StoS-01.

A third record in this example indicates that a connection related to a packet to which a packet ID of PC-013 is assigned record is identified by a connection ID of CN-12 and that a subnet combination related to the packet is identified by a subnet combination ID of StoS-01.

A fourth record in this example indicates that a connection related to a packet to which a packet ID of PC-014 has been assigned is identified by a connection ID of CN-13 and that a subnet combination related to the packet is identified by a subnet combination ID of StoS-02.

A fifth record in this example indicates that a connection related to a packet to which a packet ID of PC-015 has been assigned is identified by a connection ID of CN-13 and that a subnet combination related to the packet is identified by a subnet combination ID of StoS-02.

A sixth record in this example indicates that a connection related to a packet to which a packet ID of PC-016 has been assigned is identified by a connection ID of CN-11 and that a subnet combination related to the packet is identified by a subnet combination ID of StoS-01.

A connection table in the third embodiment is as illustrated in FIG. 16.

In the third embodiment, a subnet combination table is stored in the sorted data storage unit 123 besides the connection table described above. FIG. 27 illustrates an example of the subnet combination table. In the subnet combination table, data that defines a subnet combination is set for each subnet combination. The subnet combination table has a record for each subnet combination. The record has a field in which a subnet combination ID is set, a field in which a transmission source subnet address is set, and a field in which a transmission destination subnet address is set. Although, in this example, a subnet combination is defined by a transmission source subnet address and a transmission destination subnet address, it may be defined by other data.

A first record in this example indicates that a host combination ID of StoS-01 is assigned to a combination of a transmission source subnetwork with a subnet address of 10.20.30.0/24 and a transmission destination subnetwork with a subnet address of 20.30.40.0/24.

A second record in this example indicates that a host combination ID of StoS-02 is assigned to a combination of a transmission source subnetwork with a subnet address of 30.40.50.0/24 and a transmission destination subnetwork with a subnet address of 20.30.40.0/24.

The flow (in FIG. 5) of assignment processing executed by the driver 113 is the same as in the first and second embodiments described above.

The structure (in FIG. 6) of the analyzing unit 117 is also the same as in the first and second embodiments described above.

Figure 28:
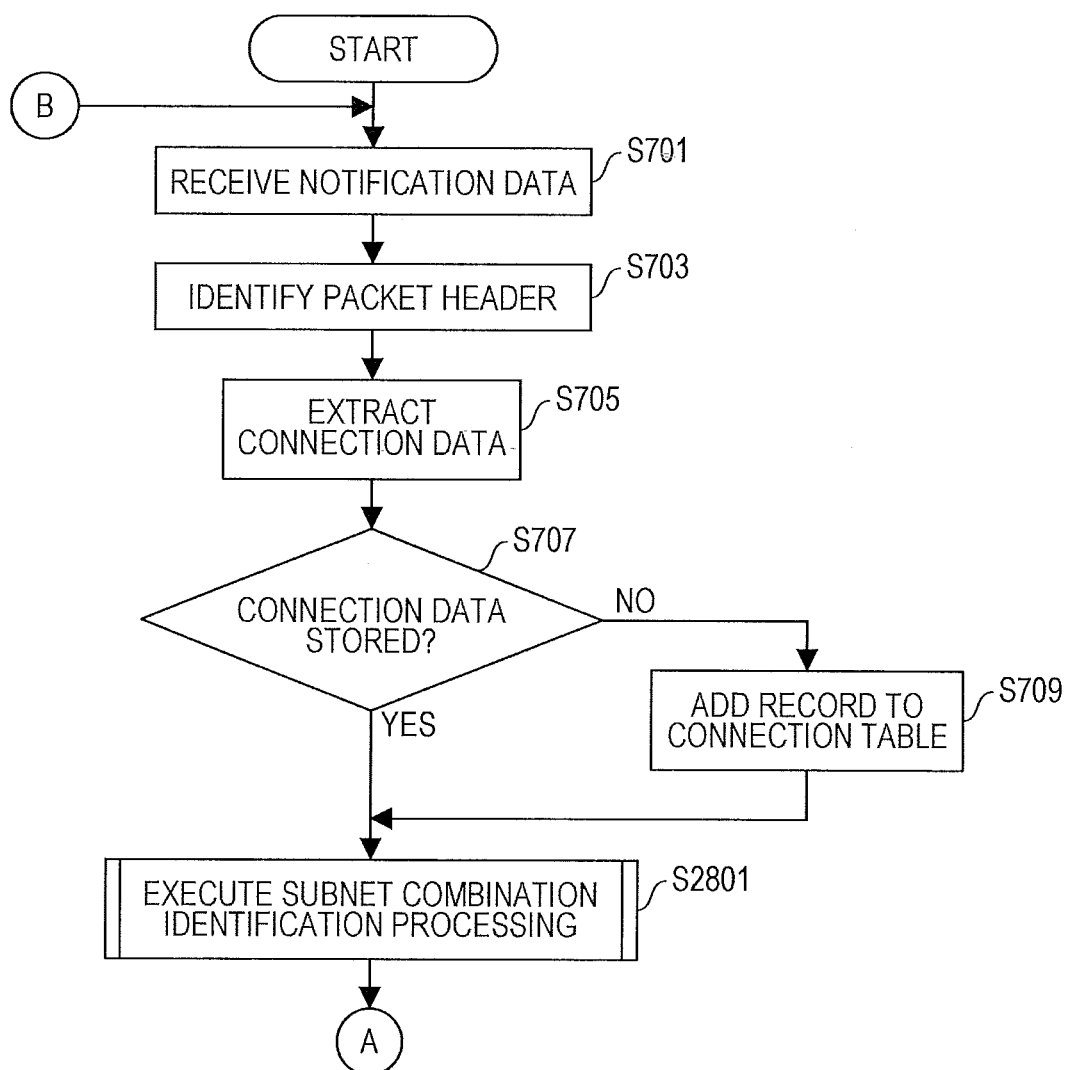
FIG. 28 illustrates a flow of processing, in the third embodiment, executed by the analyzing unit.

Processing in the analyzing unit 117 in the third embodiment will be described. FIG. 28 illustrates a flow of processing, in the third embodiment, executed by the analyzing unit 117. S701 to S709 in FIG. 28 are the same as in the first and second embodiments described above.

In the third embodiment, if the creating unit 603 decides in S707 that the connection data has been stored in the connection table (the result in S707 is Yes) or after processing in S709 has been completed, the creating unit 603 executes subnet combination identification processing (S2801).

Figure 29:
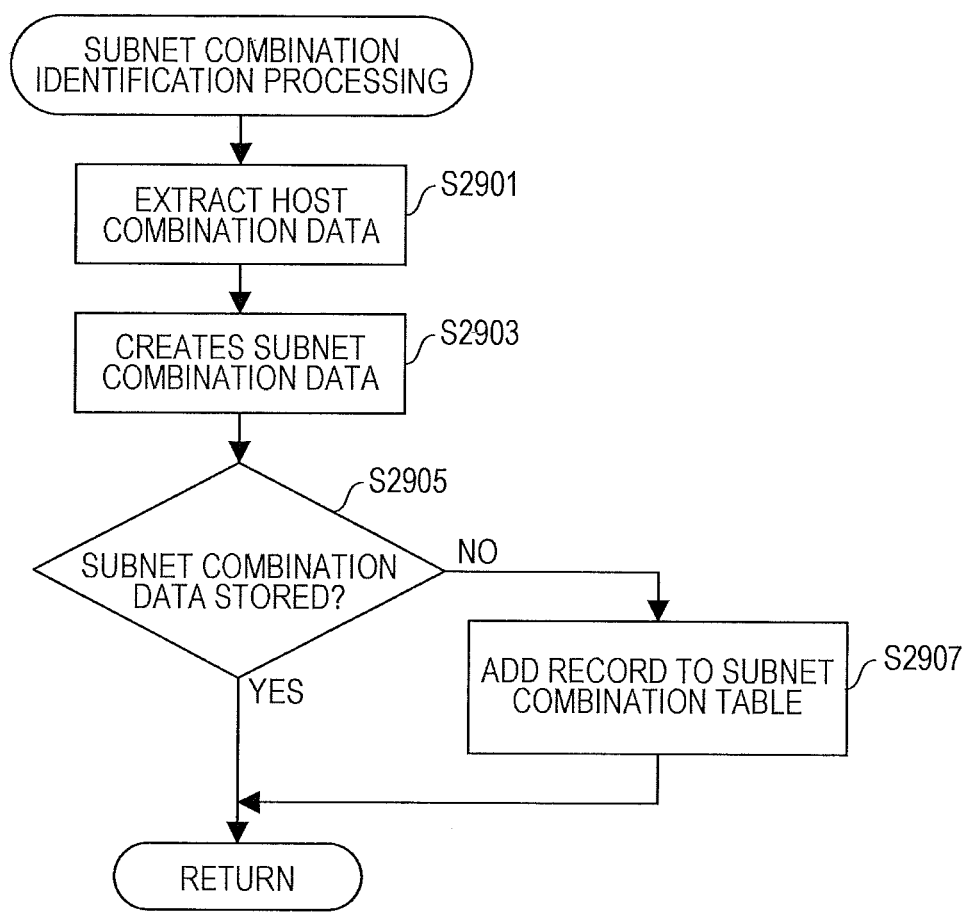
FIG. 29 illustrates a flow of subnet combination identification processing.

FIG. 29 illustrates a flow of subnet combination identification processing. The creating unit 603 extracts host combination data from the packet header (S2901). The host combination data includes a transmission source IP address and a transmission destination IP address.

The creating unit 603 creates subnet combination data (S2903). The subnet combination data includes a transmission source subnet address and a transmission destination subnet address. The transmission source subnet address is identified by identifying a 24-bit network part of the transmission source IP address and changing it to an address in classless inter-domain routing (CIDR) format. This is also true for the transmission destination subnet address; it is identified by identifying a 24-bit network part of the transmission destination IP address and changing it to a CIDR-format address. Alternatively, the creating unit 603 may set candidate CIDR-format addresses for candidate subnetworks in advance and may select a subnet address from the candidates. If, for example, 10.20.0.0/16 is set in advance as a candidate and the transmission source IP address is 10.20.30.40, the transmission source subnet address is set to 10.20.0.0/16.

The creating unit 603 decides whether the subnet combination data has been stored in the subnet combination table (in FIG. 27) (S2905).

If creating unit 603 decides that the subnet combination data has been stored in the subnet combination table (the result in S2905 is Yes), the creating unit 603 terminates the subnet combination identification processing.

If creating unit 603 decides that the subnet combination data has not been stored in the subnet combination table (the result in S2905 is No), the creating unit 603 adds a record to the subnet combination table (S2907). In the added record, a new subnet combination ID, transmission source subnet address, and transmission destination subnet address are set.

Upon completion of the subnet combination identification processing (S2801 in FIG. 28), the sequence returns to S711 in FIG. 7B.

A packet ID, a connection ID, and a subnet combination ID are set in a record that the creating unit 603 adds to the index table in S711. The subnet combination ID is identified according to the subnet combination table. Processing in S713 to S721 in FIG. 7B is the same as in the first and second embodiments described above. This completes the description of the processing executed by the analyzing unit 117.

Next, collected data 405 in the third embodiment will be described. FIG. 30 illustrates examples of the collected data 405 in the third embodiment. In the collected data in these examples as well, packets related to the same connection are linked. In collected data 405*g*, three packets related to a connection ID of CN-11 are linked. The offset of the first packet at its beginning is 0, and the offset of the second packet at its beginning is 624. In collected data 405*h*, three packets related to a connection ID of CN-12 are linked. The offset of the first packet at its beginning is 62004, and the offset of the second packet at its beginning is 63050.

In collected data 405*i*, 14 packets related to a connection ID of CN-13 are linked.

The collected data 405*g* and collected data 405*h* are the same in that their subnet combination IDs are StoS-01. In the third embodiment, the collected data 405*g* and collected data 405*h* having the same subnet combination ID are handled together. The subnet combination ID of the collected data 405*i* is StoS-02, so the collected data 405*i* is handled independently.

Meta data 405*g* for the collected data 405*g* in FIG. 30 is the same as the meta data 405*d* in FIG. 21. Meta data 405*h* for the collected data 405*h* in FIG. 30 is the same as the meta data 405*e* in FIG. 22.

Next, high-order meta data 1401 in the third embodiment will be described. FIG. 31 illustrates an example of high-order meta data 1401 in the third embodiment. The high-order meta data 1401 has a header section and a table section as in the second embodiment described above. The header section has a field in which a subnet combination ID is set, a field in which a transmission source subnet address is set, and a field in which a transmission destination subnet address is set. The subnet combination ID is an example of an identifier related to a property by which the collected data 405 is mutually correlated.

Each record in the table section has a field in which a connection ID is set and a field in which a start offset is set. A first record in the table section in this example indicates that first meta data 403*g* is identified by a connection ID of CN-11 and that first collected data 405*g* is stored starting from an offset of 0 in the collected data storage unit 807. A second record in the table section in this example indicates that second meta data 403*h* is identified by a connection ID of CN-12 and that second collected data 405*h* is stored starting from an offset of 62004 in the collected data storage unit 807.

The structure of the storage processing unit 125 is the same as in the first and second embodiments described above.

Processing by the storage processing unit 125 is as illustrated in FIG. 11. Processing in S1101 to S1105 is the same as in the first and second embodiments described above. In the third embodiment, the sorting unit 805 executes packet sorting processing (C) in S1107.

Figure 32:
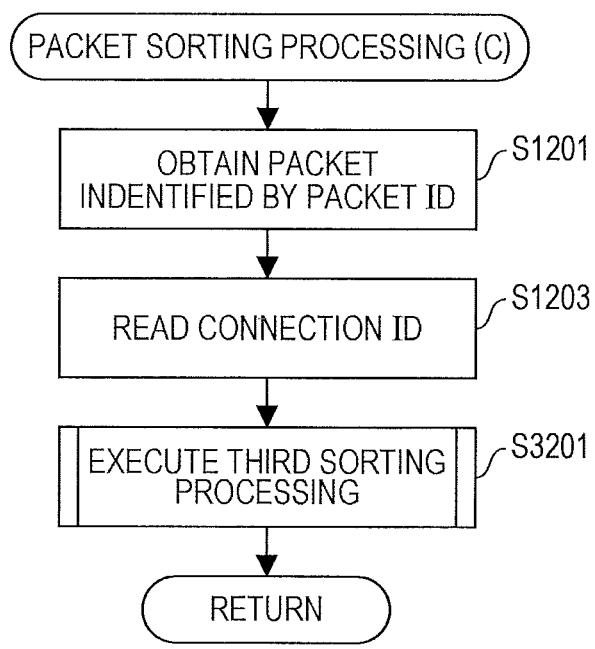
FIG. 32 illustrates a flow of packet sorting processing (C)

FIG. 32 illustrates a flow of packet sorting processing (C). Processing in S1201 and S1203 is the same as in packet sorting processing (A) in FIG. 12. The sorting unit 805 executes third sorting processing (S3201).

Figure 33:
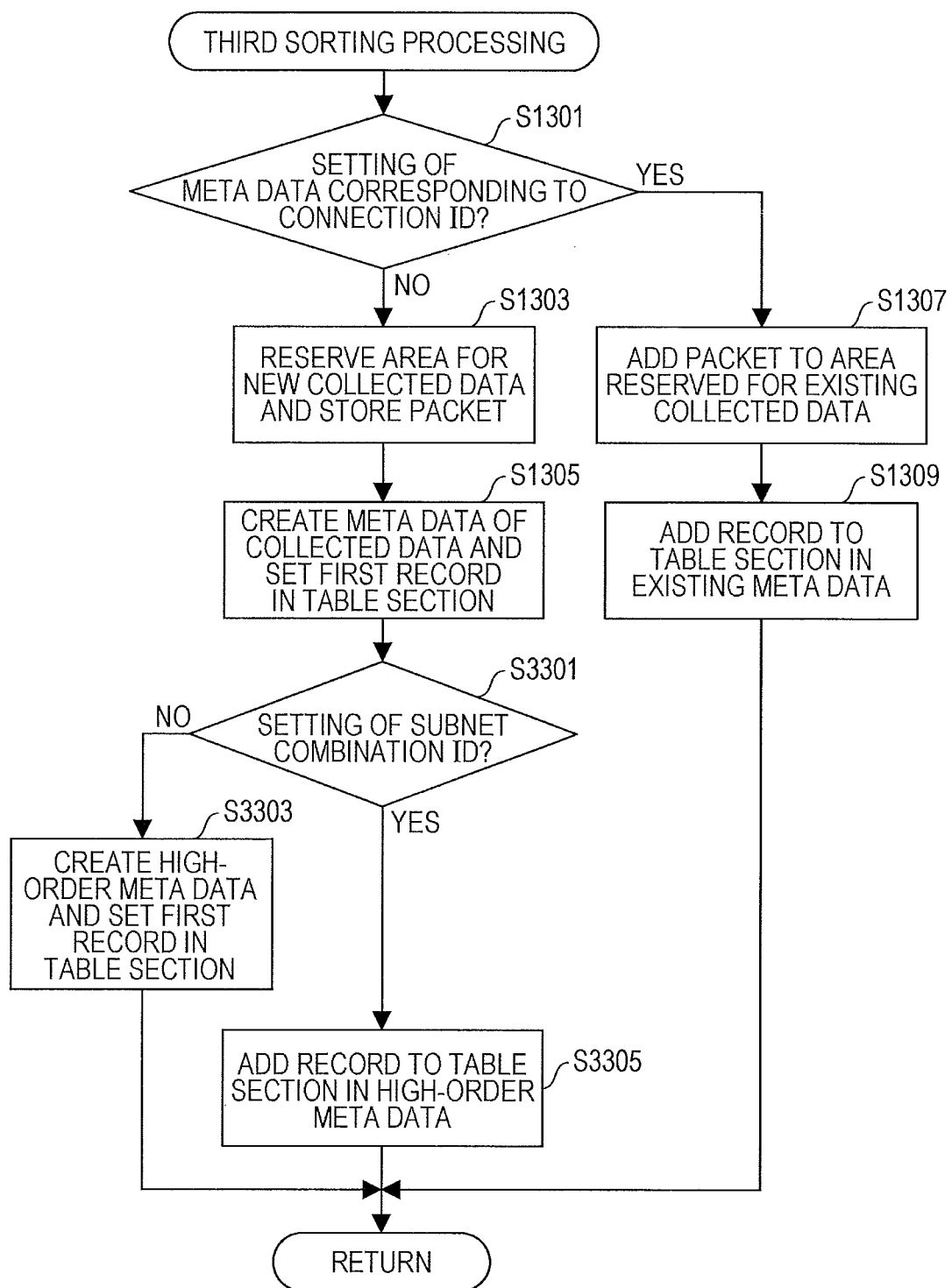
FIG. 33 illustrates a flow of third sorting processing.

FIG. 33 illustrates a flow of third sorting processing. Processing in S1301 to S1309 is the same as in the first sorting processing in FIG. 13.

After processing in S1305, the sorting unit 805 decides whether high-order meta data 1401 corresponding to the relevant subnet combination ID has been set (S3301). Specifically, the sorting unit 805 identifies the subnet combination ID included in the record identified in S1105 and decides whether the subnet combination ID is set in any high-order meta data 1401 stored in the meta data storage unit 809.

If the sorting unit 805 decides that high-order meta data 1401 corresponding to the relevant subnet combination ID has not been set (the result in S3301 is No), the sorting unit 805 creates high-order meta data 1401 in the meta data storage unit 809. A subnet combination ID, a transmission source subnet address, and a transmission destination subnet address are set in the header section in the high-order meta data 1401. The transmission source subnet address and transmission destination subnet address are obtained from the subnet combination table. The sorting unit 805 also sets a first record in the table section (S3303). A connection ID and an offset that indicates the top position of the collected data 405 are set in the record.

If the sorting unit 805 decides that high-order meta data 1401 corresponding to the relevant subnet combination ID has been set (the result in S3301 is Yes), the sorting unit 805 adds a record to the table section of the high-order meta data 1401 (S3305). A connection ID and an offset that indicates the top position of the collected data 405 are set in the record.

Upon completion of the third sorting processing, the packet sorting processing (C) in FIG. 32 is also terminated, returning to the processing in S1109 in FIG. 11. Processing in S1109 to S1117 in FIG. 11 is the same as in the first and second embodiments described above.

According to the third embodiment, packets that have been sorted according to a certain property (connection, for example) can be further handled together according to a combination of a packet transmission subnetwork and a packet transmission destination subnetwork.

Fourth Embodiment

In the fourth embodiment, an example will be described in which collected data items for which network quality is the same are stored together. Network quality indicates quality related to a communication state in the monitored network 103.

The structure of the network monitoring system is the same as in the first to third embodiments described above. The structure of the object data 401 is the same as in the second and third embodiments.

FIG. 34 illustrates an example of an index table in the fourth embodiment. For each packet, the property of the packet is set in the index table as in the first to third embodiments described above. In this example, network quality is set as a property of the packet besides the connection ID. In the description below, for easy understanding, the nature of network quality is indicated as it is. When a network is implemented, however, an identifier corresponding to the nature of network quality is used. That is, network quality itself in this example corresponds to a communication quality identifier.

A first record in this example indicates that a connection related to a packet to which a packet ID of PC-001 has been assigned is identified by a connection ID of CN-01 and that network quality of the packet is "many losses".

A second record in this example indicates that a connection related to a packet to which a packet ID of PC-002 has been assigned is identified by a connection ID of CN-02 and that network quality of the packet is "many losses".

A third record in this example indicates that a connection related to a packet to which a packet ID of PC-003 has been assigned is identified by a connection ID of CN-02 and that network quality of the packet is "many losses".

A fourth record in this example indicates that a connection related to a packet to which a packet ID of PC-004 has been assigned is identified by a connection ID of CN-03 and that network quality of the packet is "prolonged RTT".

A fifth record in this example indicates that a connection related to a packet to which a packet ID of PC-005 has been assigned is identified by a connection ID of CN-03 and that network quality of the packet is "prolonged RTT".

A sixth record in this example indicates that a connection related to a packet to which a packet ID of PC-006 has been assigned is identified by a connection ID of CN-01 and that network quality of the packet is "many losses".

The structure of the connection table is as illustrated in FIG. 3.

The flow (in FIG. 5) of assignment processing executed by the driver 113 is the same as in the first to third embodiments described above.

The structure (in FIG. 6) of the analyzing unit 117 is also the same as in the first to third embodiments described above.

Processing in the analyzing unit 117 in the fourth embodiment will be described. S701 to S709 in FIG. 7A are executed as in the first to third embodiments described above.

Figure 35:
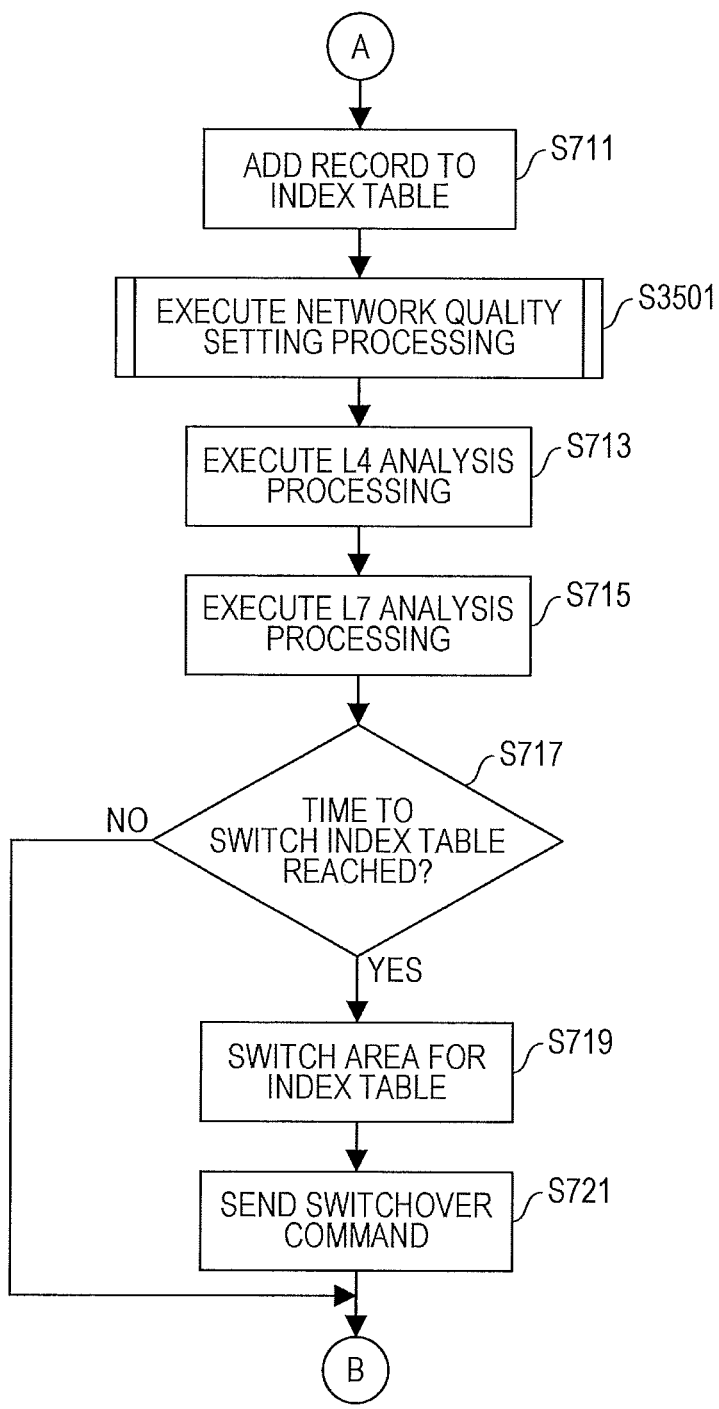
FIG. 35 illustrates a flow of processing, in the fourth embodiment, executed by the analyzing unit.

In the fourth embodiment, the sequence then proceeds to the processing in FIG. 35. A packet ID and a connection ID are set in a record that the creating unit 603 adds to the index table in S711.

Figure 36:
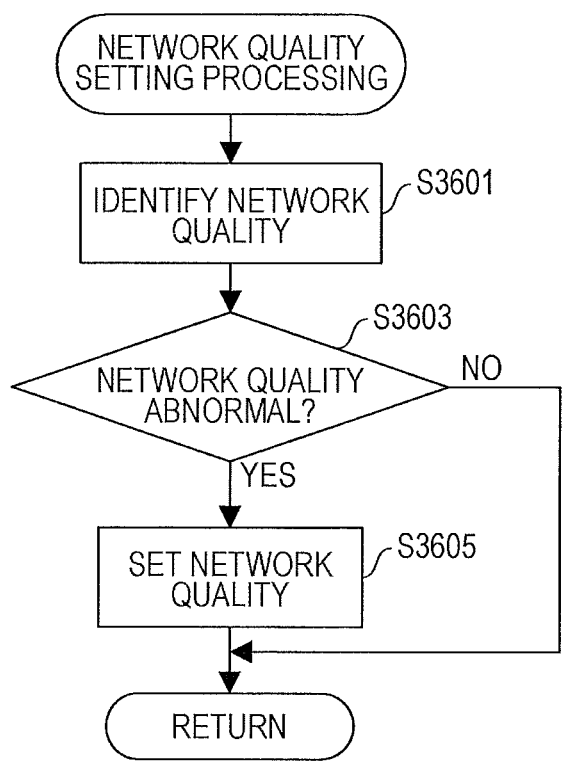
FIG. 36 illustrates a flow of network quality setting processing.

The creating unit 603 executes network quality setting processing (S3501). FIG. 36 illustrates a flow of network quality setting processing. The L4 analyzing unit 131 analyzes the state of the connection of the packet and identifies network quality (S3601). For example, the L4 analyzing unit 131 identifies the rate of losses in a certain period of the connection. Alternatively, the L4 analyzing unit 131 identifies the increasing rate of RTT.

The L4 analyzing unit 131 decides whether network quality is abnormal (S3603). If, for example, the rate of losses exceeds a threshold, the L4 analyzing unit 131 decides that network quality is abnormal. "Many losses" indicates network quality in this situation. Alternatively, if the increasing rate of RTT exceeds a threshold, the L4 analyzing unit 131 decides that network quality is abnormal. "Prolonged RTT" indicates network quality in this situation.

If the L4 analyzing unit 131 decides that network quality is abnormal, the creating unit 603 sets the nature of network quality ("many losses", for example) in the record corresponding to the index data (S3605). If the L4 analyzing unit 131 decides that network quality is not abnormal, that is, the network quality is normal, "normal", which is an initial value, is left unchanged without the nature of network quality being set. Alternatively, the creating unit 603 may set "normal" in the index data when the L4 analyzing unit 131 decides that network quality is not abnormal.

Upon completion of the network quality setting processing, the sequence returns to S713 in FIG. 35. Processing in S713 to S721 is the same as in the first to third embodiments described above.

Next, collected data 405 in the fourth embodiment will be described. FIG. 37 illustrates examples of collected data 405 in the fourth embodiment. In the collected data in these examples as well, packets related to the same connection are linked. In collected data 405*j*, three packets related to a connection ID of CN-01 are linked. The offset of the first packet at its beginning is 0, and the offset of the second packet at its beginning is 624. In collected data 405*k*, three packets related to a connection ID of CN-02 are linked. The offset of the first packet at its beginning is 62004, and the offset of the second packet at its beginning is 63050. In collected data 405*l*, 14 packets related to a connection ID of CN-03 are linked.

The collected data 405*j* and collected data 405*k* are the same in that network quality is "many losses". In the fourth embodiment, the collected data 405*j* and collected data 405*k* for which network quality is the same are handled together. The network quality of the collected data 405*l* is "prolonged RTT", so the collected data 405*l* is handled independently.

Figure 38:
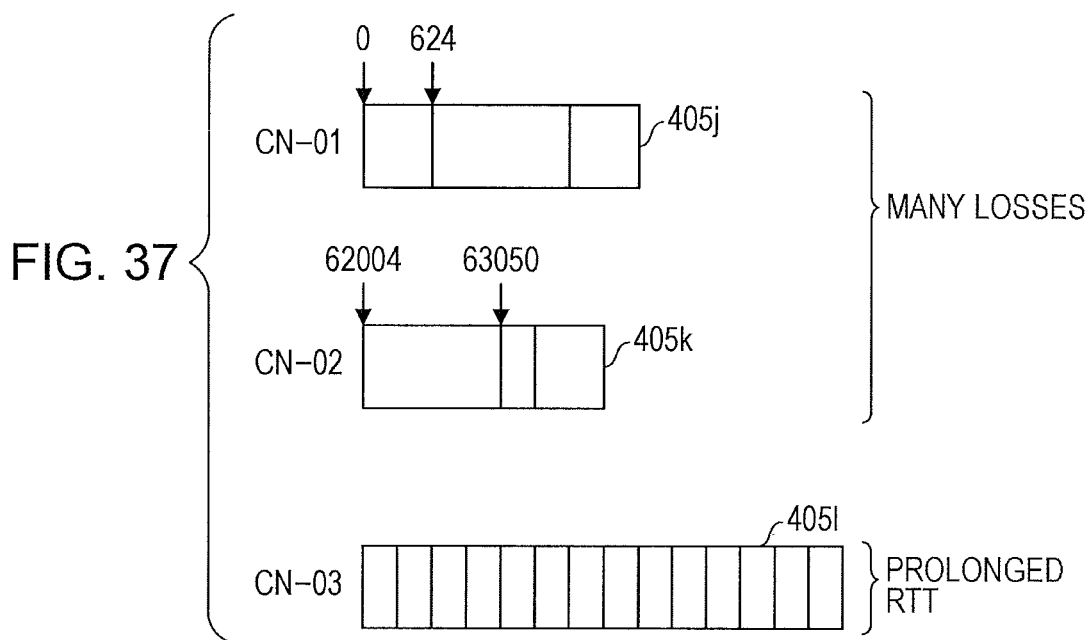
FIG. 38 illustrates an example of high-order meta data in the fourth embodiment.

Next, high-order meta data 1401 in the fourth embodiment will be described. FIG. 38 illustrates an example of high-order meta data 1401 in the fourth embodiment. The high-order meta data 1401 has a header section and a table section as in the second and third embodiments described above. The header section has a field in which network quality is set. Network quality is an example of an identifier related to a property by which the collected data 405 is mutually correlated.

Each record in the table section has a field in which a connection ID is set and a field in which a start offset is set. A first record in the table section in this example indicates that first meta data 403*j* is identified by a connection ID of CN-01 and that first collected data 405*j* is stored starting from an offset of 0 in the collected data storage unit 807. A second record in the table section in this example indicates that second meta data 403*k* is identified by a connection ID of CN-02 and that second collected data 405*k* is stored starting from an offset of 62004 in the collected data storage unit 807.

The structure of the storage processing unit 125 is the same as in the first to third embodiments described above.

Processing by the storage processing unit 125 is as illustrated in FIG. 11. Processing in S1101 to S1105 is the same as in the first to third embodiments described above. In the fourth embodiment, the sorting unit 805 executes packet sorting processing (D) in S1107.

Figure 39:
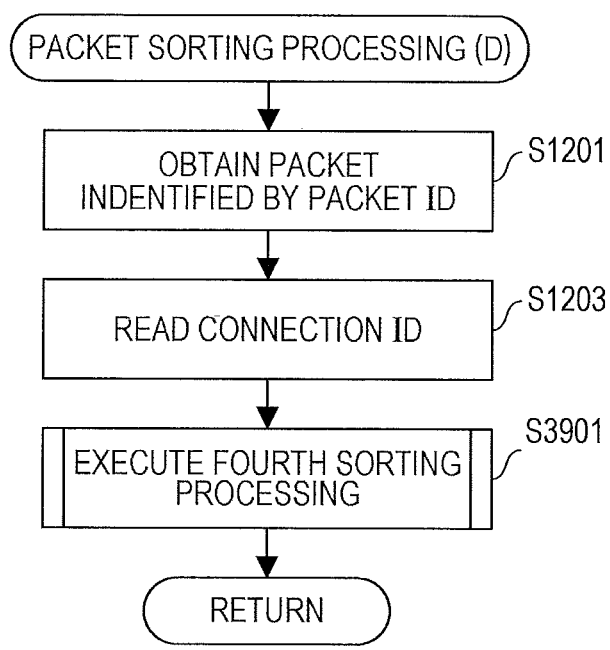
FIG. 39 illustrates a flow of packet sorting processing (D)

FIG. 39 illustrates a flow of packet sorting processing (D). Processing in S1201 and S1203 is the same as in packet sorting processing (A) in FIG. 12. The sorting unit 805 executes fourth sorting processing (S3901).

Figure 40:
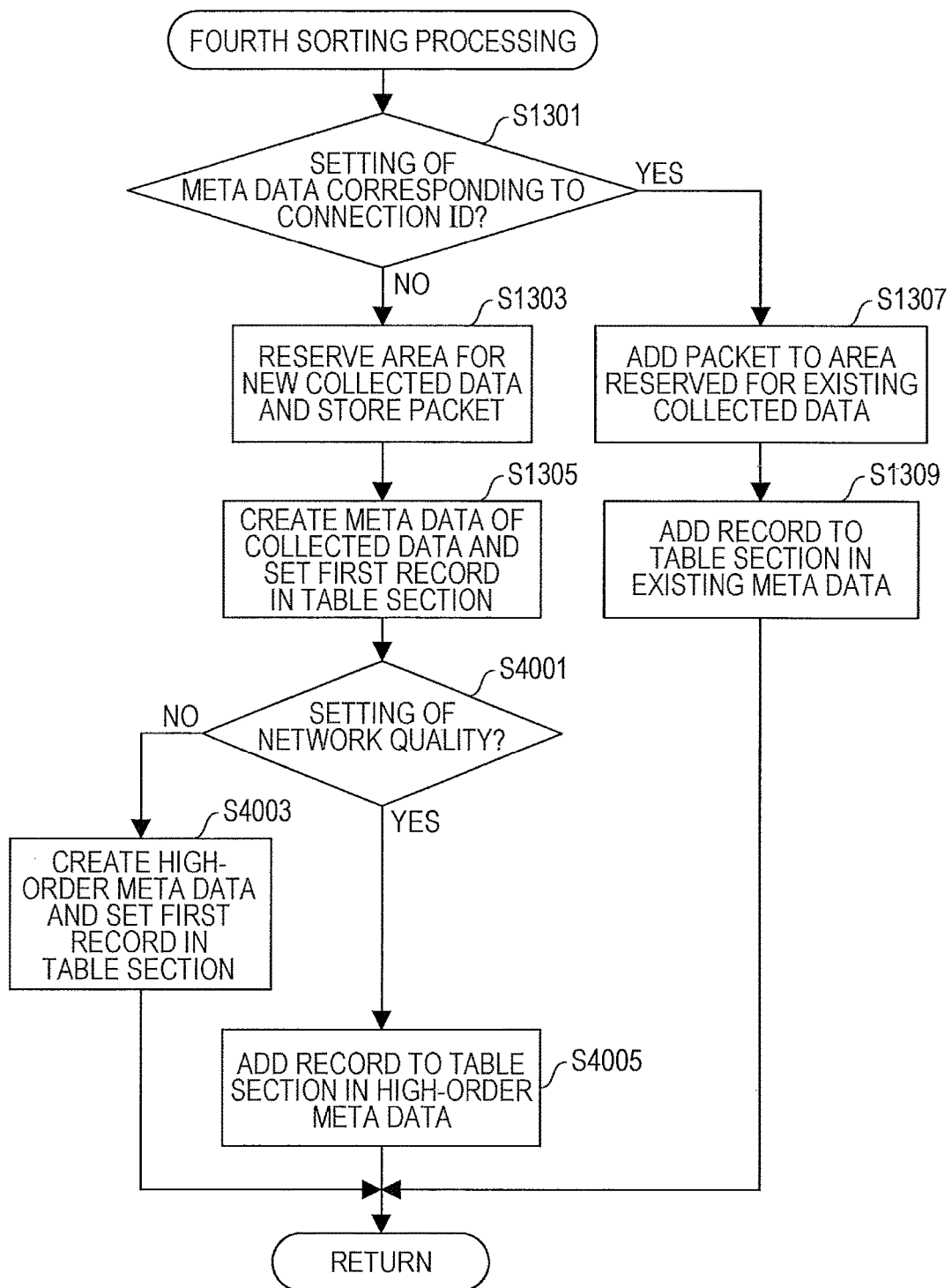
FIG. 40 illustrates a flow of fourth sorting processing.

FIG. 40 illustrates a flow of fourth sorting processing. Processing in S1301 to S1309 is the same as in the first sorting processing in FIG. 13.

After processing in S1305, the sorting unit 805 decides whether high-order meta data 1401 corresponding to the relevant network quality nature has been set (S4001). Specifically, the sorting unit 805 identifies the network quality nature included in the record identified in S1105 and decides whether the network quality nature is set in any high-order meta data 1401 stored in the meta data storage unit 809.

If the sorting unit 805 decides that high-order meta data 1401 corresponding to the relevant network quality nature has not been set (the result in S4001 is No), the sorting unit 805 creates high-order meta data 1401 in the meta data storage unit 809. The network quality nature is set in the header section in the high-order meta data 1401. The sorting unit 805 also sets a first record in the table section (S4003). A connection ID and an offset that indicates the top position of the collected data 405 are set in the record.

If the sorting unit 805 decides that high-order meta data 1401 corresponding to the network quality nature has been set (the result in S4001 is Yes), the sorting unit 805 adds a record to the table section of the high-order meta data 1401 (S4005). A connection ID and an offset that indicates the top position of the collected data 405 are set in the record.

Upon completion of the fourth sorting processing, the packet sorting processing (D) in FIG. 32 is also terminated, returning to the processing in S1109 in FIG. 11. Processing in S1109 to S1117 in FIG. 11 is the same as in the first to third embodiments described above.

According to the fourth embodiment, packets that have been sorted according to a certain property (connection, for example) can be further handled in correlation with communication quality.

Fifth Embodiment

In the fifth embodiment, an example will be described in which collected data items for which a URL to which a hypertext transfer protocol (HTTP) request (simply referred to below as the request) has been sent is the same are stored together.

The structure of the network monitoring system is the same as in the first to fourth embodiments described above.

The structure of the object data 401 is the same as in the second to fourth embodiments.

FIG. 41 illustrates an example of an index table in the fifth embodiment. For each packet, the property of the packet is set in the index table as in the first to fourth embodiments described above. In this example, a URLID, which identifies the URL to which a request has been sent, is set as a property of the packet besides the connection ID.

A first record in this example indicates that a connection related to a packet to which a packet ID of PC-011 has been assigned is identified by a connection ID of CN-11 and that a URL to which the packet has issued a request is identified by URL-01.

A second record in this example indicates that a connection related to a packet to which a packet ID of PC-012 has been assigned is identified by a connection ID of CN-12 and that a URL to which the packet has issued a request is identified by URL-01.

A third record in this example indicates that a connection related to a packet to which a packet ID of PC-013 has been assigned is identified by a connection ID of CN-12 and that a URL to which the packet has issued a request is identified by URL-01.

A fourth record in this example indicates that a connection related to a packet to which a packet ID of PC-014 has been assigned is identified by a connection ID of CN-13 and that a URL to which the packet has issued a request is identified by URL-01.

A fifth record in this example indicates that a connection related to a packet to which a packet ID of PC-015 has been assigned is identified by a connection ID of CN-13 and that a URL to which the packet has issued a request is identified by URL-01.

The sixth record in this example indicates that a connection related to a packet to which a packet ID of PC-016 has been assigned is identified by a connection ID of CN-11 and that a URL to which the packet has issued a request is identified by URL-01.

The structure of the connection table is as illustrated in FIG. 16.

Next, a URL table stored in the sorted data storage unit 123 will be described. FIG. 42 illustrates an example of a URL table. The URL table identifies a URLID assigned to each URL. The URL table has URL-specific records. Each record has a field in which a URLID is set and a field in which a URL is set.

A first record in this example indicates that a URLID of URL-01 is assigned to a URL of www.example.com. A second record indicates that a URLID of URL-02 is assigned to a URL of www.example2.com/sports.

Next, a related table stored in the sorted data storage unit 123 will be described. FIG. 43 illustrates an example of a related table. The related table correlates a URLID with a connection. The related table is used to infer a URLID from a connection. The related table has URLID-specific records. Each record has a field in which a URLID is set and a field in which a connection ID is set.

A first record in this example indicates that a packet related to a connection with a connection ID of CN-11 has issued a request to a URL identified by a URLID of URL-01. A second record in this example indicates that a packet related to a connection with a connection ID of CN-12 has issued a request to a URL identified by a URLID of URL-01. A third record in this example indicates that a packet related to a connection with a connection ID of CN-13 has issued a request to a URL identified by a URLID of URL-01.

The flow (in FIG. 5) of assignment processing executed by the driver 113 is the same as in the first to fourth embodiments described above.

The structure (in FIG. 6) of the analyzing unit 117 is also the same as in the first to fourth embodiments described above.

Processing in the analyzing unit 117 in the fifth embodiment will be described. S701 to S709 in FIG. 7A are executed as in the first to fourth embodiments described above.

Figure 44:
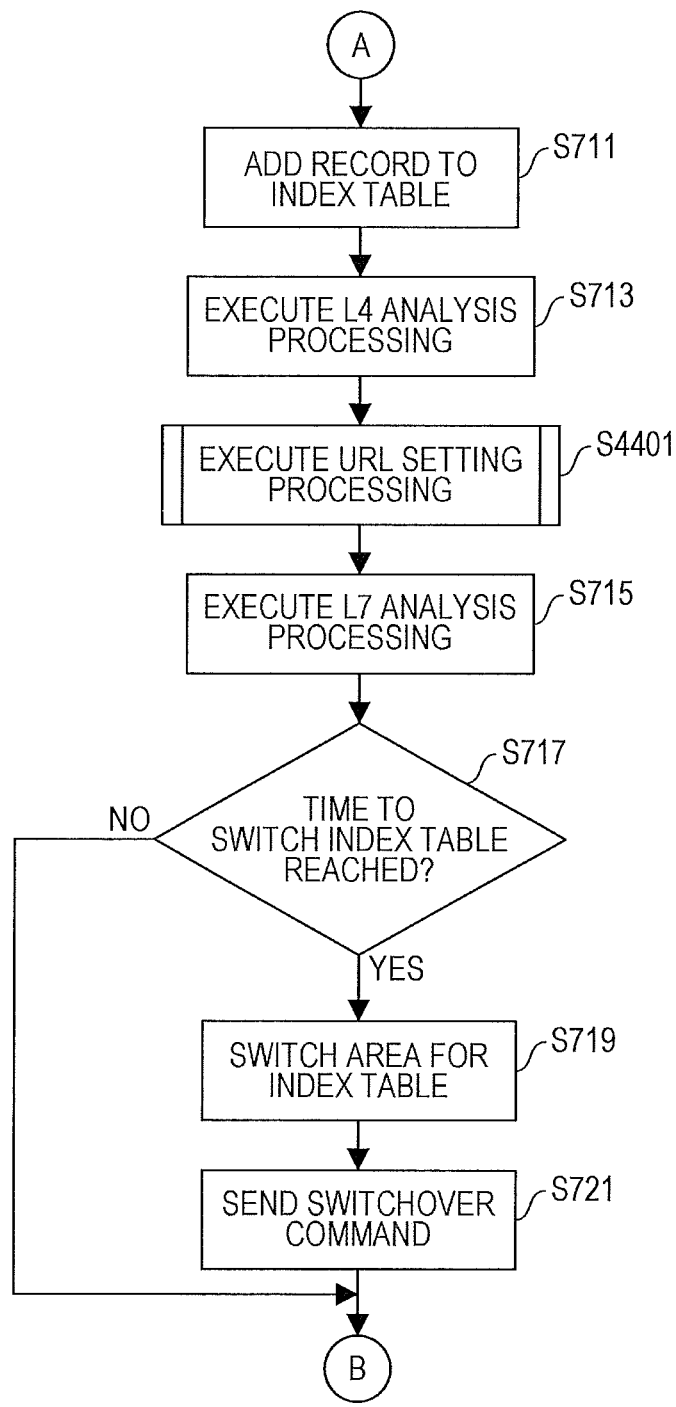
FIG. 44 illustrates a flow of processing, in the fifth embodiment, executed by the analyzing unit.

In the fifth embodiment, the sequence then proceeds to the processing in FIG. 44. A packet ID and a connection ID are set in a record that the creating unit 603 adds to the index table in S711.

The L4 analyzing unit 131 executes L4 analysis processing as in the first to fourth embodiments described above (S713).

Figure 45:
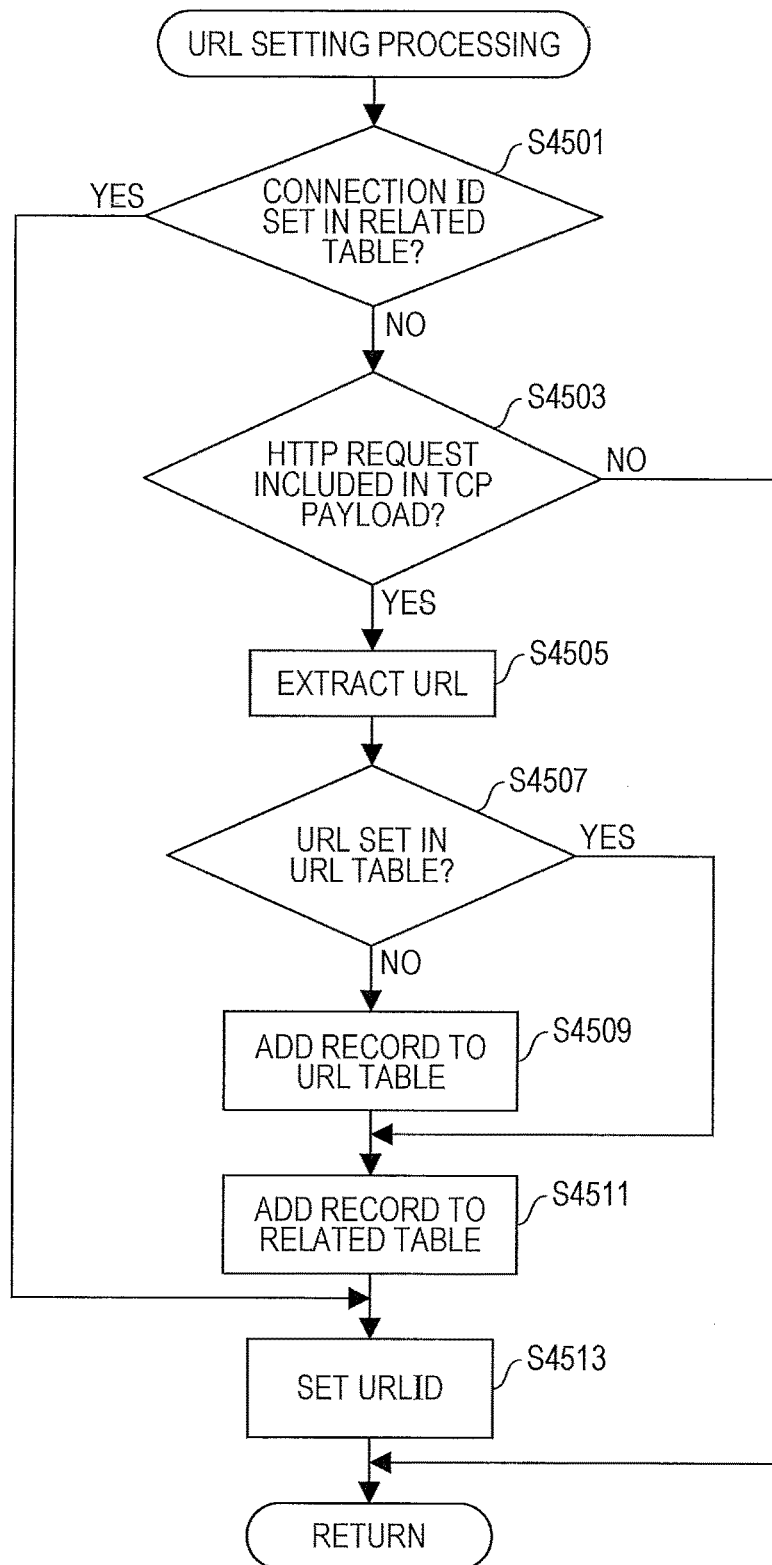
FIG. 45 illustrates a flow of URL setting processing.

Next, the creating unit 603 executes URL setting processing (S4401). FIG. 45 illustrates a flow of URL setting processing. The creating unit 603 decides whether a connection ID has been set in the related table (S4501).

If the creating unit 603 decides that a connection ID has been set in the related table (the result in S4501 is Yes), the creating unit 603 identifies a URLID corresponding to the connection ID in the related table and sets the URLID as index data (S4513).

If the creating unit 603 decides that a connection ID has not been set in the related table (the result in S4501 is No), the L7 analyzing unit 133 decides whether an HTTP request is included in the TCP payload of the packet (S4503).

If the creating unit 603 decides that an HTTP request is not included in the TCP payload of the packet (the result in S4503 is No), the packet is not eligible for including a URLID, so the creating unit 603 terminates the URL setting processing without performing any processing.

If the creating unit 603 decides that an HTTP request is included in the TCP payload of the packet (the result in S4503 is Yes), the L7 analyzing unit 133 extracts the URL to which the HTTP request is sent (S4505).

The creating unit 603 decides whether the extracted URL has been set in the URL table (S4507). If the creating unit 603 decides that the extracted URL has not been set in the URL table (the result in S4507 is No), the creating unit 603 adds a record to the URL table (S4509). In the added record, a new URLID is associated with the URL.

If the creating unit 603 decides that the extracted URL has been set in the URL table (the result in S4507 is Yes), the sequence proceeds to S4511.

The creating unit 603 adds a record to the related table (S4511). In the added record, the URLID is associated with the connection ID.

The creating unit 603 sets the URLID in the record corresponding to the index data (S4513) and terminates the URL setting processing.

Upon completion of the URL setting processing, the sequence returns to S715 in FIG. 44. Processing in S715 to S721 is the same as in the first to fourth embodiments described above.

Next, collected data 405 in the fifth embodiment will be described. FIG. 46 illustrates examples of collected data 405 in the fifth embodiment. In the collected data in these examples as well, packets related to the same connection are linked. In collected data 405*m*, three packets related to a connection ID of CN-11 are linked. The offset of the first packet at its beginning is 0, and the offset of the second packet at its beginning is 624. In collected data 405*n*, three packets related to a connection ID of CN-12 are linked. The offset of the first packet at its beginning is 62004, and the offset of the second packet at its beginning is 63050.

In collected data 405*o*, 14 packets related to a connection ID of CN-03 are linked. The offset of the first packet at its beginning is 103340.

The collected data 405*m*, collected data 405*n*, and collected data 405*o* are the same in that the URLID is URL-01. In the fifth embodiment, collected data 405*m*, collected data 405*n*, and collected data 405*o* for which the URL to which a request has been sent is the same are handled together.

Next, high-order meta data 1401 in the fifth embodiment will be described. FIG. 47 illustrates an example of high-order meta data 1401 in the fifth embodiment. The high-order meta data 1401 has a header section and a table section as in the second to fourth embodiments described above. The header section has a field in which a URLID is set. The URLID is an example of an identifier related to a property by which the collected data 405 is mutually correlated.

Each record in the table section has a field in which a connection ID is set and a field in which a start offset is set. A first record in the table section in this example indicates that first meta data 403*m* is identified by a connection ID of CN-01 and that first collected data 405*m* is stored starting from an offset of 0 in the collected data storage unit 807. A second record in the table section in this example indicates that second meta data 403*n* is identified by a connection ID of CN-02 and that second collected data 405*n* is stored starting from an offset of 62004 in the collected data storage unit 807. A third record in the table section in this example indicates that third meta data 403*o* is identified by a connection ID of CN-03 and that third collected data 405*o* is stored starting from an offset of 103340 in the collected data storage unit 807.

The structure of the storage processing unit 125 is the same as in the first to fourth embodiments described above.

Processing by the storage processing unit 125 is as illustrated in FIG. 11. Processing in S1101 to S1105 is the same as in the first to fourth embodiments described above. In the fifth embodiment, the sorting unit 805 executes packet sorting processing (E) in S1107.

Figure 48:
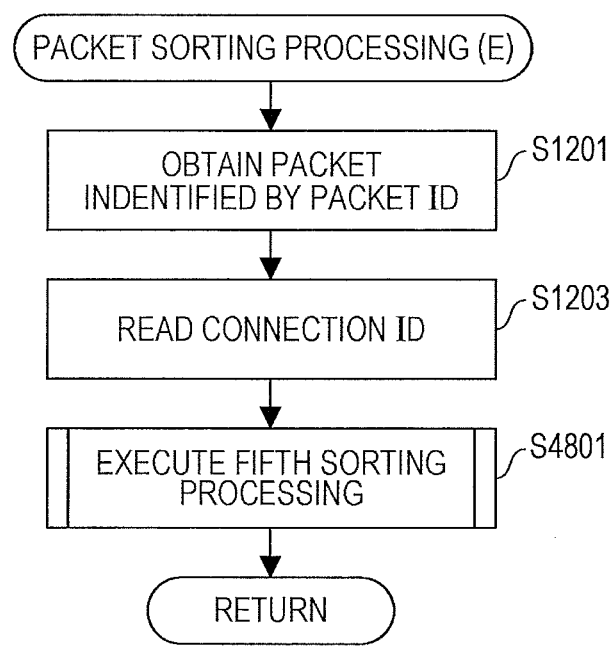
FIG. 48 illustrates a flow of packet sorting processing (E)

FIG. 48 illustrates a flow of packet sorting processing (E). Processing in S1201 and S1203 is the same as in packet sorting processing (A) in FIG. 12. The sorting unit 805 executes fifth sorting processing (S4801).

Figure 49:
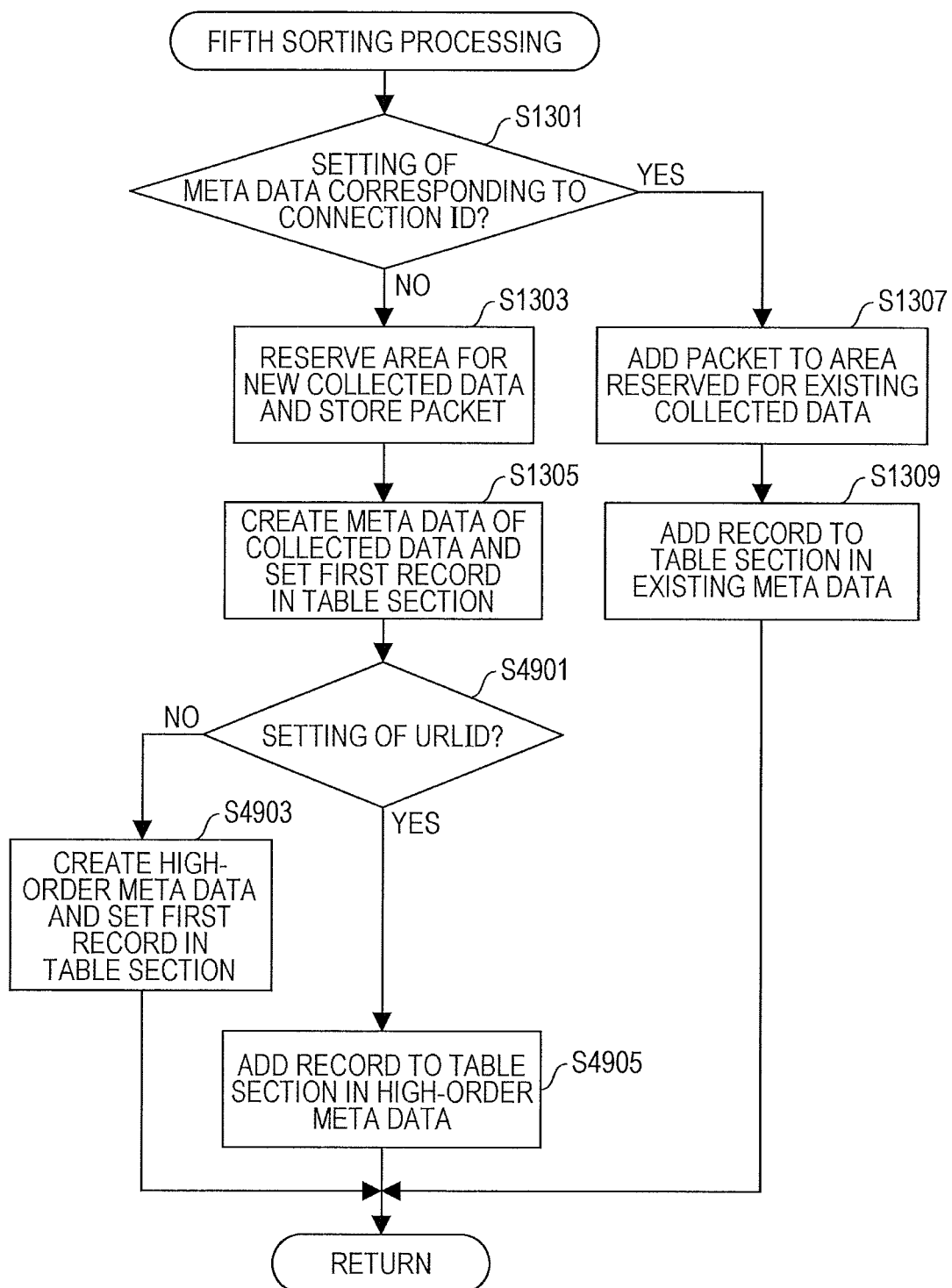
FIG. 49 illustrates a flow of fifth sorting processing.

FIG. 49 illustrates a flow of fifth sorting processing. Processing in S1301 to S1309 is the same as in the first sorting processing in FIG. 13.

After processing in S1305, the sorting unit 805 decides whether high-order meta data 1401 corresponding to the relevant URLID has been set (S4901). Specifically, the sorting unit 805 identifies the URLID included in the record identified in S1105 and decides whether the URLID is set in any high-order meta data 1401 stored in the meta data storage unit 809.

If the sorting unit 805 decides that high-order meta data 1401 corresponding to the relevant URLID has not been set (the result in S4901 is No), the sorting unit 805 creates high-order meta data 1401 in the meta data storage unit 809. The URLID is set in the header section in the high-order meta data 1401. The sorting unit 805 also sets a first record in the table section (S4903). A connection ID and an offset that indicates the top position of the collected data 405 are set in the record.

If the sorting unit 805 decides that high-order meta data 1401 corresponding to the relevant URLID has been set (the result in S4901 is Yes), the sorting unit 805 adds a record to the table section of the high-order meta data 1401 (S4905). A connection ID and an offset that indicates the top position of the collected data 405 are set in the record.

Upon completion of the fourth fifth processing, the packet sorting processing (E) in FIG. 48 is also terminated, returning to the processing in S1109 in FIG. 11. Processing in S1109 to S1117 in FIG. 11 is the same as in the first to fourth embodiments described above.

At a point in time at which the L4 analyzing unit 131 detected termination of a connection, the record related to the connection may be deleted from the related table. Then, after the termination of the connection, the relationship between the URLID and the connection can be cancelled.

According to the fifth embodiment, packets that have been sorted according to a certain property (connection, for example) can be further handled in correlation with URLs to each of which a request has been sent.

Sixth Embodiment

In the sixth embodiment, an example will be described in which collected data 405 is combined by using a specified property as a key.

Figure 50:
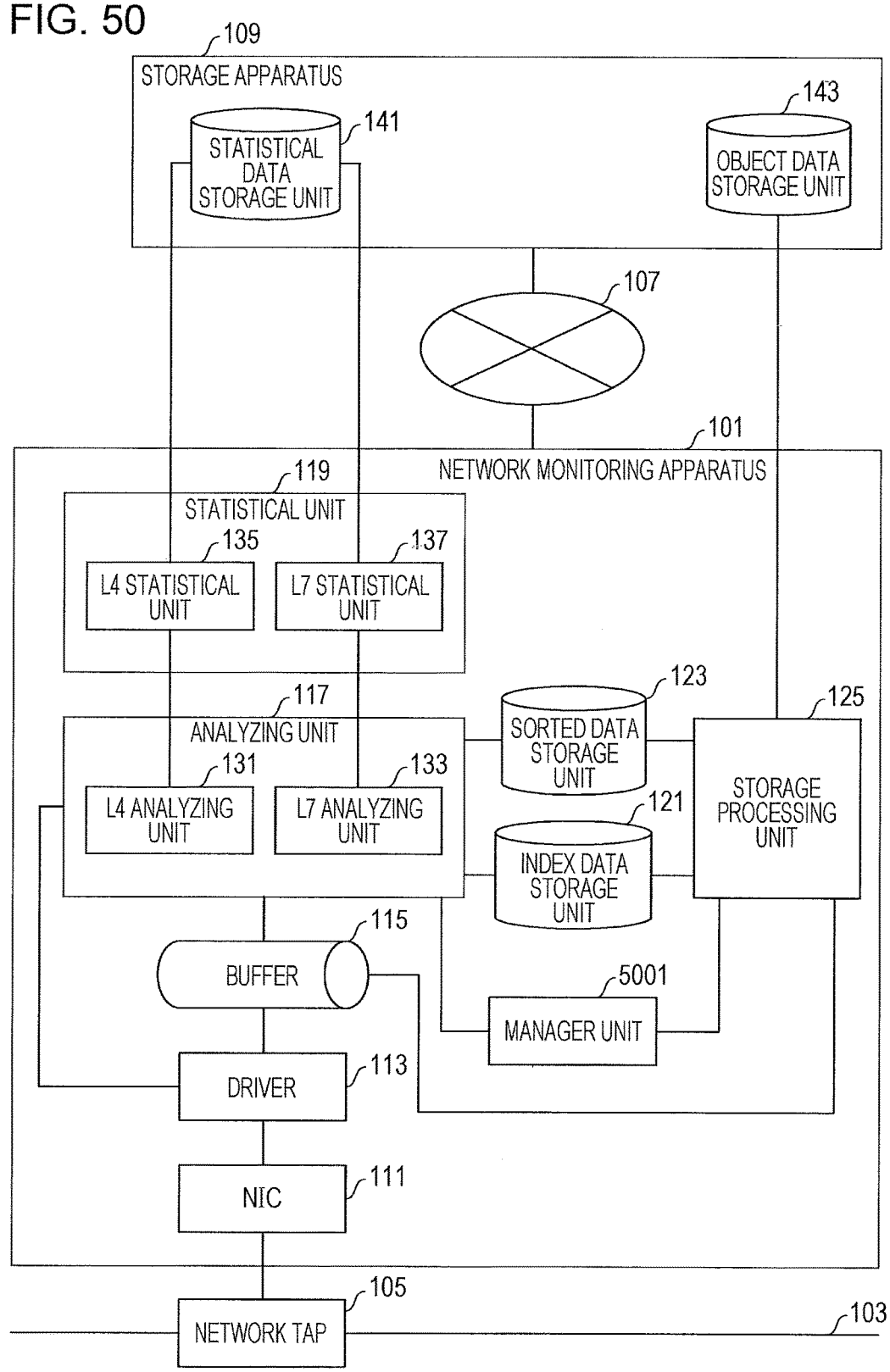
FIG. 50 illustrates an example of the structure of a network monitoring system in a sixth embodiment.

FIG. 50 illustrates an example of the structure of a network monitoring system in the sixth embodiment. The network monitoring apparatus 101 further includes a manager unit 5001. The manager unit 5001 accepts a storage condition that specifies one or a plurality of properties and controls the analyzing unit 117 and storage processing unit 125.

Figure 51:
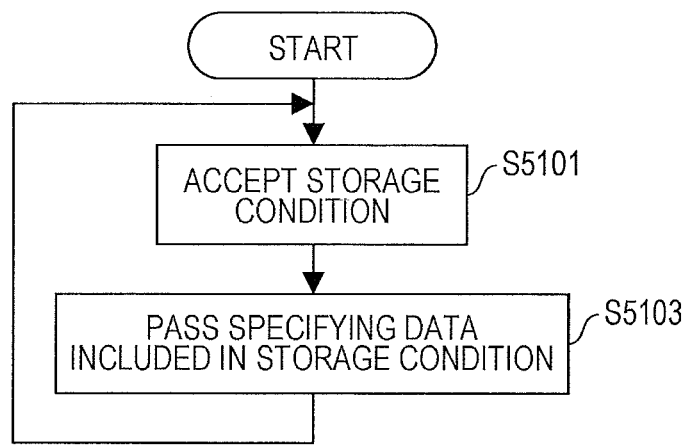
FIG. 51 illustrates a flow of processing executed by a manager unit.

FIG. 51 illustrates a flow of processing executed by the manager unit 5001. The manager unit 5001 accepts a user-entered storage condition that specifies one or a plurality of properties (S5101). Alternatively, the manager unit 5001 accepts a storage condition that specifies one or a plurality of properties from another apparatus, for instance.

Upon acceptance of the storage condition, the manager unit 5001 passes specifying data included in the accepted storage condition to the analyzing unit 117 and storage processing unit 125 (S5103). The manager unit 5001 then returns to S5101, where the manager unit 5001 repeats the processing to accept a storage condition.

Figure 52B:
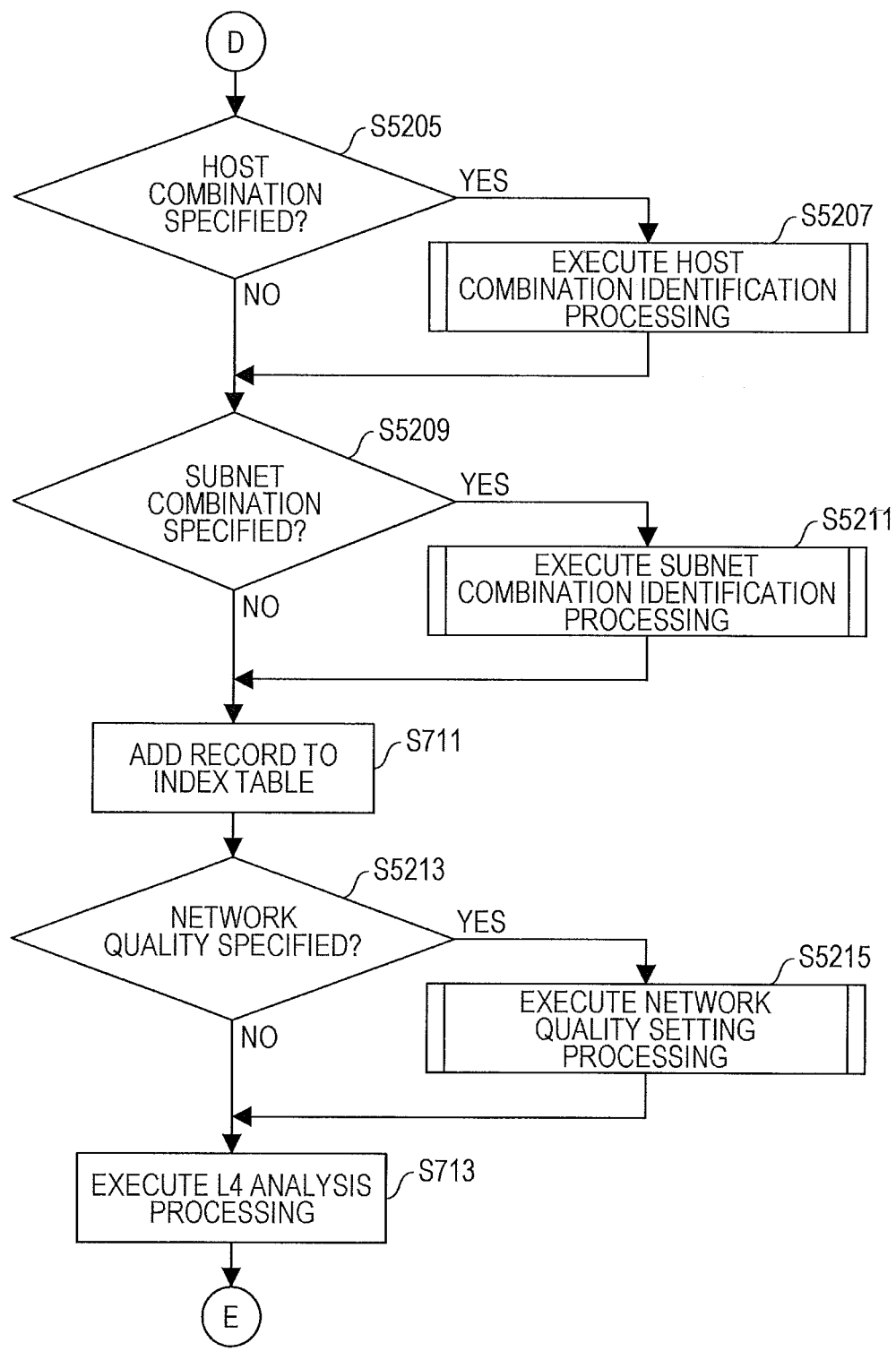
FIG. 52B illustrates a flow of processing, in the sixth embodiment, executed by the analyzing unit.

FIG. 52A illustrates a flow of processing, in the sixth embodiment, executed by the analyzing unit 117. The accepting unit 601 decides whether specifying data included in a storage condition has been accepted (S5201). If the accepting unit 601 decides that specifying data included in a storage condition has been accepted (the result in S5201 is Yes), the analyzing unit 117 stores the specifying data in the storage unit 607 (S5203). If the accepting unit 601 decides that specifying data included in a storage condition has not been accepted (the result in S5201 is No), the accepting unit 601 proceeds to S701 without performing any processing.

S701 to S709 are executed as in the first to fifth embodiments described above. Upon completion of S709, the sequence proceeds to the processing in FIG. 52B.

The creating unit 603 decides whether a host combination has been specified in the specifying data (S5205). If the creating unit 603 decides that a host combination has been specified in the specifying data (the result in S5205 is Yes), the creating unit 603 executes the host combination identification processing described above (S5207). If the creating unit 603 decides that a host combination has not been specified in the specifying data (the result in S5205 is No), the creating unit 603 does not execute the host combination identification processing.

The creating unit 603 decides whether a subnet combination has been in the specifying data (S5209). If the creating unit 603 decides that a subnet combination has been specified in the specifying data (the result in S5209 is Yes), the creating unit 603 executes the subnet combination identification processing described above (S5211). If the creating unit 603 decides that a subnet combination has not been specified in the specifying data (the result in S5209 is No), the creating unit 603 does not execute the subnet combination identification processing.

A packet ID and a connection ID are set in a record that the creating unit 603 adds to the index table in S711. If the host combination identification processing is executed, a host combination ID is also set in the record. If the subnet combination identification processing is executed, a subnet combination ID is also set in the record.

Each record in the index table in the sixth embodiment has a field in which a packet ID is set, a field in which a connection ID is set, a field in which a host combination ID is set, a field in which a subnet combination ID is set, a field in which a network quality nature is set, and a field in which a URLID is set.

The creating unit 603 decides whether network quality has been specified in the specifying data (S5213). If the creating unit 603 decides that network quality has been specified in the specifying data (the result in S5213 is Yes), the creating unit 603 executes the network quality setting processing described above (S5215). If the creating unit 603 decides that network quality has not been specified in the specifying data (the result in S5213 is No), the creating unit 603 does not execute the network quality setting processing.

Figure 52C:
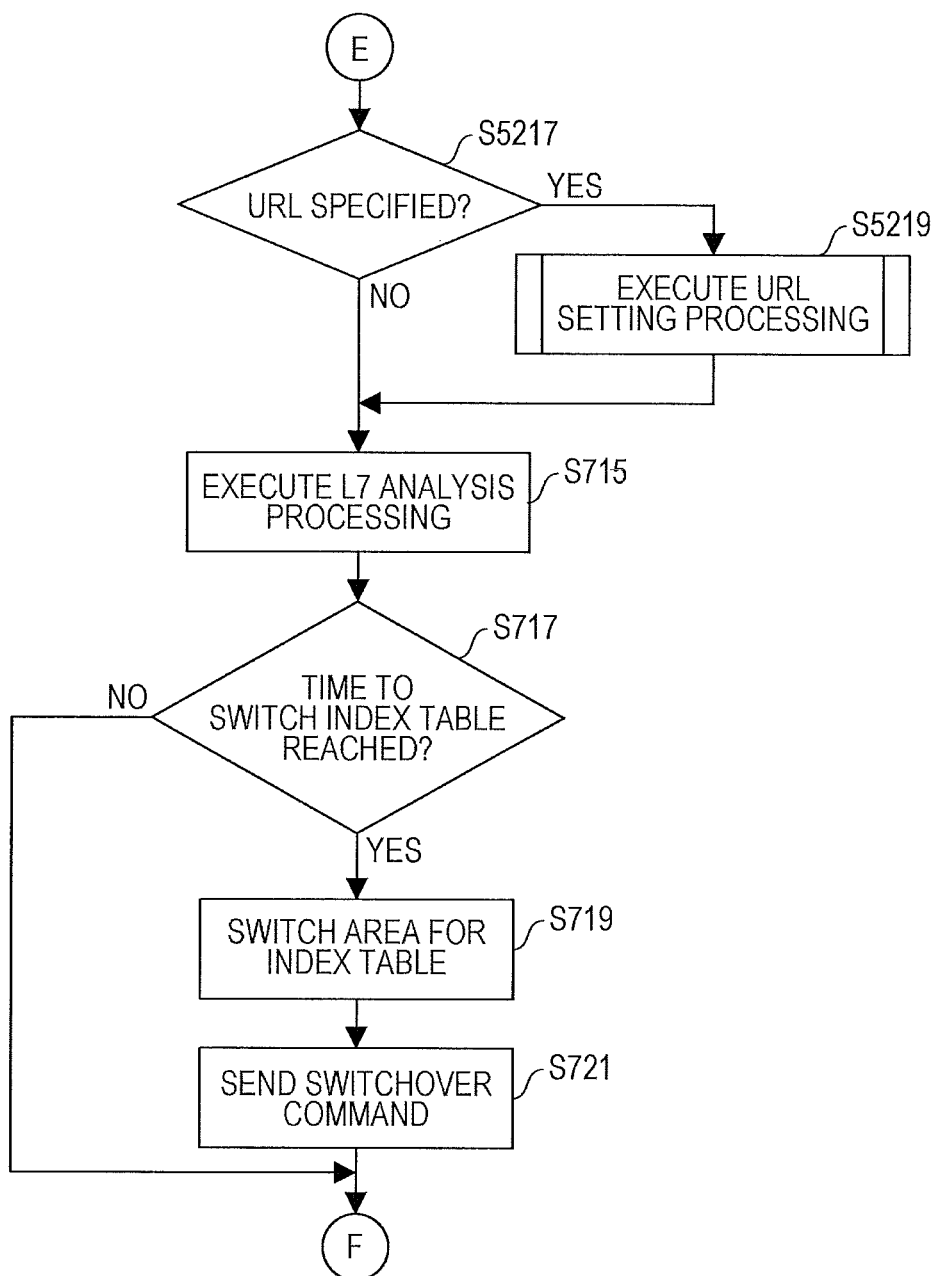
FIG. 52C illustrates a flow of processing, in the sixth embodiment, executed by the analyzing unit.

Processing in S713 is the same as in the first to fifth embodiments described above. Upon completion of S713, the sequence proceeds to the processing in FIG. 52C.

The creating unit 603 decides whether a URL has been specified in the specifying data (S5217). If the creating unit 603 decides that a URL has been specified in the specifying data (the result in S5217 is Yes), the creating unit 603 executes the URL setting processing described above (S5219). If the creating unit 603 decides that a URL has not been specified in the specifying data (the result in S5217 is No), the creating unit 603 does not execute the URL setting processing.

Processing in S717 to S721 is the same as in the first to fifth embodiments described above. Upon completion of S721, the sequence returns to S5201 in FIG. 52A to repeat the processing described above.

FIG. 53 illustrates a flow of processing, in the sixth embodiment, executed by the storage processing unit 125. The sorting unit 805 decides whether specifying data included in a storage condition has been accepted (S5301). If the sorting unit 805 decides that specifying data included in a storage condition has been accepted (the result in S5301 is Yes), the sorting unit 805 stores the specifying data in the storage unit 803 (S5303). If the sorting unit 805 decides that specifying data included in a storage condition has not been accepted (the result in S5301 is No), the sorting unit 805 proceeds to S1101 without performing any processing.

Processing in S1101, S1103, S1115, and S1117 is the same as in the first to fifth embodiments described above.

Figure 54A:
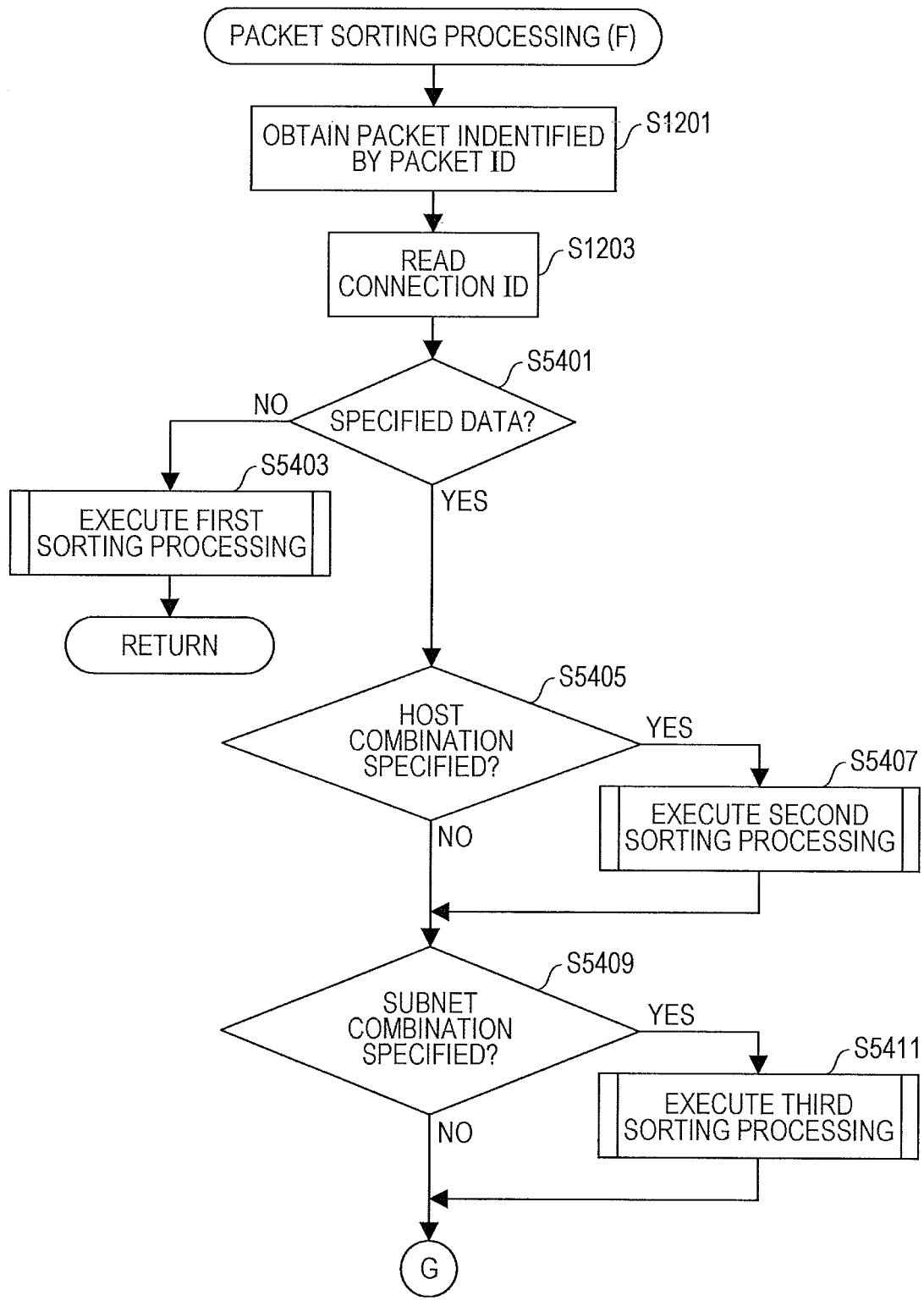
FIG. 54A illustrates a flow of packet sorting processing (F)

The sorting unit 805 executes packet sorting processing (F) (S5305). FIG. 54A illustrates a flow of packet sorting processing (F). Processing in S1201 and S1203 is the same as in the first to fifth embodiments described above.

The sorting unit 805 decides whether there is specifying data (S5401). If the sorting unit 805 decides that there is no specifying data (the result in S5401 is No), the sorting unit 805 executes the first sorting processing (S5403) and terminates the packet sorting processing (F).

If the sorting unit 805 decides that there is specifying data (the result in S5401 is Yes), the sorting unit 805 decides whether a host combination has been specified in the specifying data (S5405). If the sorting unit 805 decides that a host combination has been specified (the result in S5405 is Yes), the sorting unit 805 executes the second sorting processing described above (S5407). If the sorting unit 805 decides that a host combination has not been specified (the result in S5405 is No), the sorting unit 805 does not execute the second sorting processing.

Figure 54B:
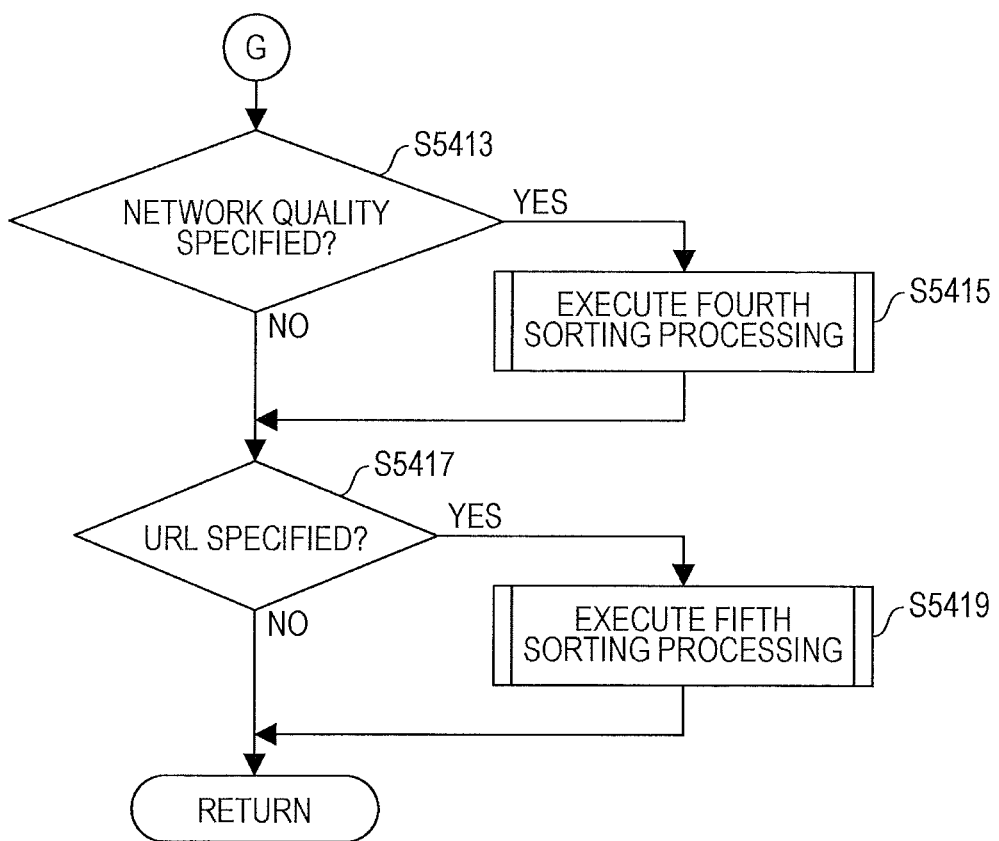
FIG. 54B illustrates a flow of packet sorting processing (F)

The sorting unit 805 then decides whether a subnet combination has been specified in the specifying data (S5409). If the sorting unit 805 decides that a subnet combination has been specified (the result in S5409 is Yes), the sorting unit 805 executes the third sorting processing described above (S5411). If the sorting unit 805 decides that a subnet combination has not been specified (the result in S5409 is No), the sorting unit 805 does not execute the third sorting processing. Then, the sequence proceeds to the processing in FIG. 54B.

The sorting unit 805 then decides whether network quality has been specified in the specifying data (S5413). If the sorting unit 805 decides that network quality has been specified (the result in S5413 is Yes), the sorting unit 805 executes the fourth sorting processing described above (S5415). If the sorting unit 805 decides that network quality has not been specified (the result in S5413 is No), the sorting unit 805 does not execute the fourth sorting processing.

The sorting unit 805 then decides whether a URL has been specified in the specifying data (S5417). If the sorting unit 805 decides that a URL has been specified in the specifying data (the result in S5417 is Yes), the sorting unit 805 executes the fifth sorting processing described above (S5419). If the sorting unit 805 decides that a URL has not been specified in the specifying data (the result in S5417 is No), the sorting unit 805 does not execute the fifth sorting setting processing.

Upon completion of the packet sorting processing (F), the sequence returns to S1109 in FIG. 53. Processing in S1109 to S1113 is the same as in the first to fifth embodiments described above.

According to the sixth embodiment, packets that have been sorted according to a certain property (connection, for example) can be handled in correlation with another property specified in an accepted storage condition.

So far, embodiments of the present disclosure have been described, but the present disclosure is not limited to them.

The structure of each storage area described above is only an example. It is not a limitation. Furthermore, the sequence in each processing flow can be changed if the processing result is not changed. Processing may be concurrently executed.

The network monitoring apparatus 101 described above is a computer apparatus. As illustrated in FIG. 55, a memory 2601, a central processing unit (CPU) 2603, a hard disk drive (HDD) 2605, a display control unit 2607 connected to a display unit 2609, a drive unit 2613 for a removable disk 2611, an input apparatus 2615, and communication units 2617 (in FIGS. 55, 2617a and 2617b) may be mutually connected through a bus 2619. In some cases, the display control unit 2607, display unit 2609, drive unit 2613, and input apparatus 2615 may not be included. An operating system (OS) and application programs that execute processing in the embodiments of the present disclosure have been stored in the HDD 2605. When these programs are executed by the CPU 2603, they are read from the HDD 2605 and loaded into the memory 2601. If desirable, the CPU 2603 controls the display control unit 2607, communication units 2617, and drive unit 2613 to have them perform a desirable operation. Data input through any one of the communication units 2617 is output from another communication unit 2617. The CPU 2603 controls the communication units 2617 so as to select an appropriate output destination. Data in the middle of processing is stored in the memory 2601 and, if desirable, is stored in the HDD 2605. In the embodiments of the present disclosure, the application programs that execute the processing described above are distributed in the form of being stored on the removable disk 2611, which is computer-readable, and are installed from the drive unit 2613 in the HDD 2605. In some cases, the application programs are installed in the HDD 2605 through a network such as the Internet and a communication unit 2617. In this type of computer apparatus, hardware components such as the CPU 2603 and memory 2601 described above and programs such as an OS and desirable application programs cooperate to implement the functions described above.

The embodiments of the present disclosure, which have been described above, are summarized as follows.

A packet storage method in an embodiment of the present disclosure includes processing in which a sequence identifier is successively assigned to a packet captured from a network and the packet is stored in a buffer, creation processing in which the packet is read out from the buffer, a first identifier involved in a property of the packet is identified, and index data that mutually correlates the sequence identifier and the first identifier is created, and storage processing in which the packet corresponding to the sequence identifier included in the index data is read out from the buffer, the packet is sorted according to the first identifier included in the index data, and the sorted packet is stored in a storage unit on a per-first-identifier basis.

Then, it is possible to reduce a load involved in instant analysis processing performed when captured packets are mutually correlated according to their properties. Since, for example, a complicated procedure such as in list analysis is not used, processing can be performed with a small amount of resources under a small load.

In the storage processing, the packet-specific sequence identifier may be stored in the storage unit together with the packet that has been sorted.

Then, a sequence in which packets have been captured can be identified. This is useful when, for example, the sequence of packets is changed in the order in which they have been captured.

The property may be a connection of the packet. The first identifier may be a connection identifier. In the creation processing, a transmission source apparatus address, a transmission source port identifier, a transmission destination apparatus address, and a transmission destination port identifier may be extracted from the packet and the connection identifier may be identified from the extracted transmission source apparatus address, transmission source port identifier, transmission destination apparatus address, and transmission destination port identifier.

Then, when packets are collected for each connection, processing to identify the connection of a packet and processing to sort the packet according to its connection and then store the sorted packet are separately performed, so processing loads can be distributed.

The packet storage method described above may include first switching processing in which an area to which write the index data created in the creation processing is switched from a first storage area to a second storage area. The method also include second switching processing in which an area from which to read out the index data in the storage processing is switched from the second storage area to the first storage area in synchronization with the first switching processing.

Then, it is possible to avoid problems caused by an insufficient area during the storage of index data and by a wait for a storage unit to complete processing.

In the creation processing, a second identifier may be identified for each packet, the second identifier being related to another property different from the above property, and the index data may be correlated with the second identifier. In the storage processing, after packets having the same first identifier have been sorted according to their first identifiers, the packets may be mutually correlated.

Then, packets that have been sorted according to a certain property can be further handled together according to another property. This is useful in, for example, analyzing packets related to a certain property and another property.

The other property may be a combination of a transmission source apparatus from which the packet has been transmitted and a transmission destination apparatus to which the packet has been transmitted. The second identifier may be an apparatus combination identifier. In the creation processing, a transmission source apparatus address and a transmission destination apparatus address may be extracted from the packet, and the apparatus combination identifier may be identified from the extracted transmission source apparatus address and transmission destination apparatus address.

Then, packets that have been sorted according to a certain property can be further handled in correlation with a combination of a packet transmission source apparatus and a packet transmission destination apparatus.

The other property may be a combination of a transmission source subnetwork of the packet and a transmission destination subnetwork of the packet. The second identifier may be a subnetwork combination identifier. In the creation processing, a transmission source subnetwork and a transmission destination subnetwork may be extracted from the packet, and the subnetwork combination identifier may be identified from the extracted transmission source subnetwork and transmission destination subnetwork.

Then, packets that have been sorted according to a certain property can be further handled in correlation with a combination of a packet transmission source subnetwork and a packet transmission destination subnetwork.

The other property may be the communication quality of the network. The second identifier may be a communication quality identifier. In the creation processing, the communication quality identifier may be identified through analysis concerning the state of a connection of the packet.

Then, packets that have been sorted according to a certain property can be further handled in correlation with communication quality.

The other property may be a URL to which a request has been issued by the packet. The second identifier may be a URL identifier. In the creation processing, the URL identifier may be identified from the URL extracted from the packet.

Then, packets that have been sorted according to a certain property can be further handled in correlation with a URL to which a request has been issued.

The packet storage method may further include processing in which a storage condition that specifies one or a plurality of other properties is accepted. The creation processing may be carried out according to one or a plurality of other properties specified by the storage condition. Similarly, the storage processing may be carried out according to one or a plurality of other properties specified by the storage condition.

Then, packets that have been sorted according to a certain property can be handled in correlation with another or other properties specified in the accepted storage condition.

Programs that cause a computer to execute processing implemented by the method described above can be created. These programs may be stored, for example, on a computer-readable recording medium or in a storage unit; examples of the computer-readable recording medium include a flexible disk, a compact disk-read-only memory (CD-ROM), a magneto-optic disk, a semiconductor memory, and a hard disk. In general, intermediate processing results are temporarily stored in a storage unit such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A packet storage method comprising:
processing in which a sequence identifier is successively assigned to a packet captured from a network and the packet is stored in a buffer;
creation processing in which the packet is read out from the buffer, a first identifier involved in a first property of the packet is identified, and an index data that mutually correlates the sequence identifier and the first identifier is created; and
storage processing, executed by a processor, in which the packet corresponding to the sequence identifier included in the index data is read out from the buffer, the packet is sorted according to the first identifier included in the index data, and the sorted packet is stored in a storage unit together with other sorted packets having a same first identifier, each of the packets stored in the storage unit being stored with an offset that indicates a position of the respective packet relative to a beginning of capturing packets from the network.

2. The packet storage method according to claim 1, wherein in the storage processing, the sequence identifier corresponding to the sorted packet is stored in the storage unit with the packet that has been sorted.

3. The packet storage method according to claim 1, wherein
the first property is related to a connection of the packet;
the first identifier is a connection identifier; and
in the creation processing, a transmission source apparatus address, a transmission source port identifier, a transmission destination apparatus address, and a transmission destination port identifier are extracted from the packet and the connection identifier is identified from the transmission source apparatus address, transmission source port identifier, transmission destination apparatus address, and transmission destination port identifier.

4. The packet storage method according to claim 1, further comprising:

first switching processing in which an area to which the index data created in the creation processing is written is switched from a first storage area to a second storage area; and
second switching processing in which an area from which the index data in the storage processing is read is switched from the second storage area to the first storage area in synchronization with the first switching processing.

5. The packet storage method according to claim 1, wherein
in the creation processing, a second identifier is identified for each packet, the second identifier being related to a second property different from the first property and the index data is correlated with the second identifier; and
in the storage processing, after packets having the same first identifier have been sorted according to first identifiers of the plackets, the packets are mutually correlated.

6. The packet storage method according to claim 5, wherein
the second property is a combination of a transmission source apparatus from which the packet has been transmitted and a transmission destination apparatus to which the packet has been transmitted,
the second identifier is an apparatus combination identifier, and
in the creation processing, a transmission source apparatus address and a transmission destination apparatus address are extracted from the packet, and the apparatus combination identifier is identified from the transmission source apparatus address and the transmission destination apparatus address.

7. The packet storage method according to claim 5, wherein
the second property is related to a combination of a transmission source subnetwork of the packet and a transmission destination subnetwork of the packet,
the second identifier is a subnetwork combination identifier, and
in the creation processing, a transmission source subnetwork and a transmission destination subnetwork are extracted from the packet, and the subnetwork combination identifier is identified from the transmission source subnetwork and the transmission destination subnetwork.

8. The packet storage method according to claim 5, wherein
the second property is related to a communication quality of the network,
the second identifier is a communication quality identifier, and
in the creation processing, the communication quality identifier is identified through analysis concerning a state of a connection of the packet.

9. The packet storage method according to claim 5, wherein
the second property is related to a URL to which a request has been issued by the packet,
the second identifier is a URL identifier, and
in the creation processing, the URL identifier is identified from the URL extracted from the packet.

10. The packet storage method according to claim 5, further comprising:
processing in which a storage condition that specifies one or a plurality of third properties different from the first property is accepted, wherein the creation processing and the storage processing are executed according to one or a plurality of third properties specified by the storage condition.

11. A non-transitory computer-readable recording medium storing a program that causes a computer to execute a procedure, the procedure comprising:

processing in which a sequence identifier is successively assigned to a packet captured from a network and the packet is stored in a buffer;

creation processing in which the packet is read out from the buffer, a first identifier involved in a property of the packet is identified, and an index data that mutually correlates the sequence identifier and the first identifier is created; and storage processing in which the packet corresponding to the sequence identifier included in the index data is read out from the buffer, the packet is sorted according to the first identifier included in the index data, and the sorted packet is stored in a storage unit together with other sorted packets having a same first identifier, each of the packets stored in the storage unit being stored with an offset that indicates a position of the respective packet relative to a beginning of capturing packets from the network.

12. A packet storage apparatus comprising:

a memory; and a processor coupled to the memory, the processor being configured to:

successively assign a sequence identifier to a packet captured from a network and store the packet in a buffer;

read out the packet from the buffer, identify a first identifier involved in a property of the packet, and create an index data that mutually correlates the sequence identifier and the first identifier; and read out the packet corresponding to the sequence identifier included in the index data from the buffer, sort the packet according to the first identifier included in the index data, and store the packet together with other sorted packets having a same first identifier, each of the packets being stored with an offset that indicates a position of the respective packet relative to a beginning of capturing packets from the network.

* * * * *